(12) United States Patent
Beane et al.

(10) Patent No.: US 12,541,745 B2
(45) Date of Patent: Feb. 3, 2026

(54) SYSTEMS AND METHODS FOR RECYCLING CONSUMER ELECTRONIC DEVICES

(71) Applicant: ecoATM, LLC, San Diego, CA (US)

(72) Inventors: John Beane, San Diego, CA (US); Babak Forutanpour, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 265 days.

(21) Appl. No.: 17/393,168

(22) Filed: Aug. 3, 2021

(65) Prior Publication Data

US 2022/0198407 A1 Jun. 23, 2022

Related U.S. Application Data

(63) Continuation of application No. 14/967,183, filed on Dec. 11, 2015, now abandoned.

(51) Int. Cl.
| | |
|---|---|
| *G06Q 10/30* | (2023.01) |
| *G06Q 30/02* | (2023.01) |
| *G07F 7/06* | (2006.01) |
| *H04M 1/24* | (2006.01) |
| *H04W 24/00* | (2009.01) |

(52) U.S. Cl.
CPC ......... *G06Q 10/30* (2013.01); *G06Q 30/0278* (2013.01); *G07F 7/06* (2013.01); *H04W 24/00* (2013.01); *H04M 1/24* (2013.01); *Y02W 30/82* (2015.05); *Y02W 90/00* (2015.05)

(58) Field of Classification Search
None
See application file for complete search history.

(56) References Cited

U.S. PATENT DOCUMENTS

| | | | |
|---|---|---|---|
| 1,327,315 | A | 1/1920 | Davies |
| 1,730,015 | A | 10/1929 | Rooke |
| 2,817,725 | A | 12/1957 | Rochfort |
| 3,808,439 | A | 4/1974 | Renius |

(Continued)

FOREIGN PATENT DOCUMENTS

| | | |
|---|---|---|
| CA | 2760863 | 11/2010 |
| CA | 2818533 A1 | 5/2012 |

(Continued)

OTHER PUBLICATIONS

2006 Florida Statutes Title XXXIII, Chapter 538, Sections 538.03 and 538.04, 7 pages.

(Continued)

*Primary Examiner* — Jan P Mincarelli
(74) *Attorney, Agent, or Firm* — Perkins Coie LLP

(57) ABSTRACT

Systems and associated methods for recycling and performing other processes with consumer electronic devices are described herein. In various embodiments, the present technology includes systems and methods for enabling, e.g., a retailer to identify and evaluate a used or pre-owned consumer electronic device, such as a mobile phone, laptop, etc. to facilitate purchasing the device from the consumer. In some embodiments, the present technology includes an evaluator input device and an evaluator hub device that together evaluate a device and facilitate its purchase and recycling. Various other aspects of the present technology are described herein.

20 Claims, 6 Drawing Sheets

(56) References Cited

U.S. PATENT DOCUMENTS

| | | |
|---|---|---|
| 4,248,334 A | 2/1981 | Hanley et al. |
| 4,519,522 A | 5/1985 | McElwee |
| 4,593,820 A | 6/1986 | Antonie |
| 4,715,709 A | 12/1987 | Sekine et al. |
| 4,821,118 A | 4/1989 | Lafreniere |
| 4,845,636 A | 7/1989 | Walker |
| 4,870,357 A | 9/1989 | Young et al. |
| 4,878,736 A | 11/1989 | Hekker et al. |
| 4,893,789 A | 1/1990 | Novorsky |
| 4,927,051 A | 5/1990 | Falk et al. |
| 4,951,308 A | 8/1990 | Bishop et al. |
| 5,025,344 A | 6/1991 | Maly et al. |
| 5,027,074 A | 6/1991 | Haferstat |
| 5,077,462 A | 12/1991 | Newell et al. |
| 5,091,773 A | 2/1992 | Fouche et al. |
| 5,105,149 A | 4/1992 | Tokura |
| 5,159,560 A | 10/1992 | Newell et al. |
| 5,216,502 A | 6/1993 | Katz |
| 5,280,170 A | 1/1994 | Baldwin |
| 5,319,459 A | 6/1994 | Mochizuki et al. |
| 5,339,096 A | 8/1994 | Beaufort et al. |
| 5,413,454 A | 5/1995 | Movesian |
| 5,419,438 A | 5/1995 | Squyres et al. |
| 5,436,554 A | 7/1995 | Decker |
| 5,482,140 A | 1/1996 | Moore |
| 5,533,645 A | 7/1996 | Wittern |
| 5,570,920 A | 11/1996 | Crisman et al. |
| 5,572,444 A | 11/1996 | Lentz et al. |
| 5,610,710 A | 3/1997 | Canfield et al. |
| 5,711,530 A | 1/1998 | Lewis |
| 5,717,780 A | 2/1998 | Mitsumune et al. |
| 5,747,784 A | 5/1998 | Walter et al. |
| 5,748,084 A | 5/1998 | Isikoff |
| 5,775,806 A | 7/1998 | Allred |
| 5,839,058 A | 11/1998 | Phillips et al. |
| 5,871,371 A | 2/1999 | Rothenberger et al. |
| 5,920,338 A | 7/1999 | Katz |
| 5,937,396 A | 8/1999 | Konya |
| 5,949,901 A | 9/1999 | Nichani et al. |
| 5,965,858 A | 10/1999 | Suzuki et al. |
| 5,966,654 A | 10/1999 | Croughwell et al. |
| 5,987,159 A | 11/1999 | Nichani |
| 5,988,431 A | 11/1999 | Roe |
| 6,029,851 A | 2/2000 | Jenkins et al. |
| 6,041,229 A | 3/2000 | Turner |
| 6,055,512 A | 4/2000 | Dean et al. |
| 6,100,986 A | 8/2000 | Rydningen |
| 6,170,702 B1 | 1/2001 | Zettler et al. |
| 6,181,805 B1 | 1/2001 | Koike et al. |
| 6,216,890 B1 | 4/2001 | Rathmer |
| 6,228,008 B1 | 5/2001 | Pollington et al. |
| 6,234,812 B1 | 5/2001 | Ivers et al. |
| 6,259,827 B1 | 7/2001 | Nichani |
| 6,264,104 B1 | 7/2001 | Jenkins et al. |
| 6,283,475 B1 | 9/2001 | Stubben |
| 6,323,782 B1 | 11/2001 | Stephens et al. |
| 6,330,354 B1 | 12/2001 | Companion et al. |
| 6,330,958 B1 | 12/2001 | Ruskin et al. |
| 6,393,095 B1 | 5/2002 | Robinson |
| 6,462,644 B1 | 10/2002 | Howell et al. |
| 6,529,837 B1 | 3/2003 | Kang |
| 6,535,637 B1 | 3/2003 | Wootton et al. |
| 6,573,886 B1 | 6/2003 | Lehtinen et al. |
| 6,587,581 B1 | 7/2003 | Matsuyama et al. |
| 6,595,684 B1 | 7/2003 | Casagrande et al. |
| 6,597,552 B1 | 7/2003 | Griepentrog et al. |
| 6,633,377 B1 | 10/2003 | Weiss et al. |
| 6,667,800 B1 | 12/2003 | Larsson et al. |
| 6,679,499 B2 | 1/2004 | Jeon |
| 6,687,679 B1 | 2/2004 | Van Luchene |
| 6,748,296 B2 | 6/2004 | Banerjee et al. |
| 6,754,637 B1 | 6/2004 | Stenz |
| 6,758,370 B2 | 7/2004 | Cooke et al. |
| 6,798,528 B1 | 9/2004 | Hartman |
| 6,822,422 B2 | 11/2004 | Sagawa |
| 6,842,596 B2 | 1/2005 | Morii et al. |
| 6,854,656 B2 | 2/2005 | Matsumori |
| 6,947,941 B1 | 9/2005 | Koon |
| D512,964 S | 12/2005 | Kissinger et al. |
| 7,062,454 B1 | 6/2006 | Giannini et al. |
| 7,066,767 B2 | 6/2006 | Liao |
| 7,069,236 B1 | 6/2006 | Tsunenari |
| 7,076,449 B2 | 7/2006 | Tsunenari et al. |
| 7,086,592 B2 | 8/2006 | Wagner et al. |
| 7,178,720 B1 | 2/2007 | Strubbe et al. |
| 7,201,125 B2 | 4/2007 | Evans |
| 7,234,609 B2 | 6/2007 | DeLazzer et al. |
| 7,251,458 B2 | 7/2007 | O'Connell |
| 7,268,345 B2 | 9/2007 | Schultz |
| 7,334,729 B2 | 2/2008 | Brewington |
| 7,343,319 B1 | 3/2008 | Jen |
| 7,407,392 B1 | 8/2008 | Cooke et al. |
| 7,408,674 B2 | 8/2008 | Moro et al. |
| 7,431,158 B2 | 10/2008 | Yamada et al. |
| 7,455,226 B1 | 11/2008 | Hammond et al. |
| 7,520,666 B2 | 4/2009 | Pevzner et al. |
| 7,529,687 B1 | 5/2009 | Phan |
| 7,567,344 B2 | 7/2009 | LeBlanc et al. |
| 7,635,131 B2 | 12/2009 | Fukazawa |
| 7,642,687 B2 | 1/2010 | Kageyama et al. |
| 7,646,193 B2 | 1/2010 | Suzuki et al. |
| 7,649,450 B2 | 1/2010 | Campion et al. |
| 7,702,108 B2 | 4/2010 | Amon et al. |
| 7,735,125 B1 | 6/2010 | Alvarez et al. |
| 7,761,331 B2 | 7/2010 | Low et al. |
| 7,783,379 B2 | 8/2010 | Beane et al. |
| 7,848,833 B2 | 12/2010 | Li |
| 7,881,965 B2 | 2/2011 | Bowles et al. |
| 7,890,373 B2 | 2/2011 | Junger |
| D640,199 S | 6/2011 | Wilson |
| 8,010,402 B1 | 8/2011 | Sharma et al. |
| 8,019,588 B1 | 9/2011 | Wohlberg et al. |
| 8,025,229 B2 | 9/2011 | Hammond et al. |
| 8,031,930 B2 | 10/2011 | Wang et al. |
| 8,107,243 B2 | 1/2012 | Guccione et al. |
| 8,112,325 B2 | 2/2012 | Foy et al. |
| 8,142,199 B1 | 3/2012 | Almouli |
| 8,156,008 B2 | 4/2012 | Bae et al. |
| 8,195,511 B2 | 6/2012 | Bowles et al. |
| 8,200,533 B2 | 6/2012 | Librizzi et al. |
| 8,200,736 B2 | 6/2012 | Shi |
| 8,215,546 B2 | 7/2012 | Lin et al. |
| 8,239,262 B2 | 8/2012 | Bowles et al. |
| 8,254,883 B2 | 8/2012 | Uchida |
| 8,266,008 B1 | 9/2012 | Siegel et al. |
| 8,340,815 B2 | 12/2012 | Peters et al. |
| 8,369,987 B2 | 2/2013 | Claessen |
| 8,401,914 B1 | 3/2013 | Kim |
| 8,417,234 B2 | 4/2013 | Sanding et al. |
| 8,423,404 B2 | 4/2013 | Bowles et al. |
| 8,429,021 B2 | 4/2013 | Kraft et al. |
| 8,463,646 B2 | 6/2013 | Bowles |
| 8,536,472 B2 | 9/2013 | Wu et al. |
| 8,543,358 B2 | 9/2013 | Trabona |
| 8,566,183 B1 | 10/2013 | Bonar et al. |
| 8,606,633 B2 | 12/2013 | Tarbert et al. |
| 8,718,717 B2 | 5/2014 | Vaknin et al. |
| 8,743,215 B1 | 6/2014 | Lee |
| 8,755,783 B2 | 6/2014 | Brahami et al. |
| 8,781,622 B2 | 7/2014 | Mockus |
| 8,806,280 B2 | 8/2014 | Stephenson |
| 8,823,794 B2 | 9/2014 | Suzuki et al. |
| 8,824,136 B1 | 9/2014 | Interian et al. |
| 8,922,643 B2 | 12/2014 | Ji et al. |
| 9,010,627 B1 | 4/2015 | Prasad et al. |
| 9,043,026 B2 | 5/2015 | Lien et al. |
| 9,075,781 B2 | 7/2015 | Matthews |
| 9,081,477 B2 | 7/2015 | Kang |
| 9,124,056 B1 | 9/2015 | Lewis, Jr. |
| 9,147,063 B1 | 9/2015 | Florissi |
| 9,153,089 B1 | 10/2015 | Hewett |
| 9,189,911 B2 | 11/2015 | Kavli et al. |
| 9,195,979 B2 | 11/2015 | Geller |
| 9,256,863 B2 | 2/2016 | Chayon et al. |

(56) References Cited

U.S. PATENT DOCUMENTS

| | | |
|---|---|---|
| 9,283,672 B1 | 3/2016 | Matthews |
| 9,317,989 B2 | 4/2016 | Grow et al. |
| 9,355,515 B2 | 5/2016 | Brahami et al. |
| 9,367,436 B2 | 6/2016 | Matthews |
| 9,367,982 B2 | 6/2016 | Chayun et al. |
| 9,378,606 B2 | 6/2016 | Chayun et al. |
| 9,390,442 B2 | 7/2016 | Lyle |
| 9,469,037 B2 | 10/2016 | Matthews |
| 9,497,563 B2 | 11/2016 | Hornung et al. |
| 9,578,133 B2 | 2/2017 | Matthews |
| 9,582,101 B2 | 2/2017 | Chang et al. |
| 9,595,238 B2 | 3/2017 | Won |
| 9,621,947 B1 | 4/2017 | Oztaskent |
| 9,641,997 B2 | 5/2017 | Vratskides |
| 9,668,298 B1 | 5/2017 | Pearl et al. |
| 9,697,548 B1 | 7/2017 | Jaff et al. |
| 9,704,142 B2 | 7/2017 | Ahn |
| 9,718,196 B2 | 8/2017 | Matthews |
| 9,792,597 B1 | 10/2017 | Abbott |
| 9,818,160 B2 | 11/2017 | Bowles et al. |
| 9,858,178 B2 | 1/2018 | Matthews |
| 9,866,664 B2 | 1/2018 | Sinha et al. |
| 9,881,284 B2 | 1/2018 | Bowles et al. |
| 9,885,672 B2 | 2/2018 | Forutanpour et al. |
| 9,904,911 B2 | 2/2018 | Bowles et al. |
| 9,911,102 B2 | 3/2018 | Bowles |
| 9,934,644 B2 | 4/2018 | Chayun et al. |
| 9,972,046 B2 | 5/2018 | Ackerman |
| 10,032,140 B2 | 7/2018 | Bowles et al. |
| 10,043,339 B2 | 8/2018 | Walker et al. |
| 10,044,843 B2 | 8/2018 | Sinha et al. |
| 10,055,798 B2 | 8/2018 | Bowles et al. |
| 10,127,647 B2 | 11/2018 | Forutanpour et al. |
| 10,157,379 B2 | 12/2018 | Singh |
| 10,157,427 B2 | 12/2018 | Bowles et al. |
| 10,261,611 B2 | 4/2019 | Matthews |
| 10,269,110 B2 | 4/2019 | Forutanpour et al. |
| 10,275,813 B2 | 4/2019 | Fu |
| 10,339,509 B2 | 7/2019 | Bordeleau et al. |
| 10,401,411 B2 | 9/2019 | Snook et al. |
| 10,417,615 B2 | 9/2019 | Bowles et al. |
| 10,438,174 B2 | 10/2019 | Bowles et al. |
| 10,445,708 B2 | 10/2019 | Hunt et al. |
| 10,452,527 B2 | 10/2019 | Matthews |
| 10,475,002 B2 | 11/2019 | Silva et al. |
| 10,496,963 B2 | 12/2019 | Silva et al. |
| 10,565,629 B2 | 2/2020 | Hartman |
| 10,572,946 B2 | 2/2020 | Bowles et al. |
| 10,600,095 B2 | 3/2020 | Ackerman |
| 10,671,367 B2 | 6/2020 | Matthews |
| 10,679,279 B2 | 6/2020 | Ward |
| 10,825,082 B2 | 11/2020 | Librizzi et al. |
| 10,846,672 B2 | 11/2020 | Dion et al. |
| 10,853,873 B2 | 12/2020 | Bowles et al. |
| 10,860,122 B2 | 12/2020 | Matthews |
| 10,860,990 B2 | 12/2020 | Bowles et al. |
| 10,909,673 B2 | 2/2021 | Forutanpour et al. |
| 10,977,700 B2 | 4/2021 | Bordeleau et al. |
| 11,010,841 B2 | 5/2021 | Bowles et al. |
| 11,080,662 B2 | 8/2021 | Bowles et al. |
| 11,080,672 B2 | 8/2021 | Bowles |
| 11,107,046 B2 | 8/2021 | Bowles |
| 11,122,034 B2 | 9/2021 | Cicchitto |
| 11,126,973 B2 | 9/2021 | Silva et al. |
| 11,232,412 B2 | 1/2022 | Hunt et al. |
| 11,315,093 B2 | 4/2022 | Bowles |
| 11,436,570 B2 | 9/2022 | Bowles et al. |
| 11,443,289 B2 | 9/2022 | Bowles et al. |
| 11,462,868 B2 | 10/2022 | Forutanpour et al. |
| 11,482,067 B2 | 10/2022 | Forutanpour et al. |
| 11,526,932 B2 | 12/2022 | Bowles et al. |
| 11,907,915 B2 | 2/2024 | Bowles et al. |
| 12,182,773 B2 | 12/2024 | Bowles |
| 12,198,108 B2 | 1/2025 | Bowles |
| 12,205,081 B2 | 1/2025 | Bowles et al. |
| 12,217,221 B2 | 2/2025 | Silva et al. |
| 2001/0025883 A1 | 10/2001 | Ichihara et al. |
| 2001/0035425 A1 | 11/2001 | Rocco et al. |
| 2001/0039531 A1 | 11/2001 | Aoki |
| 2002/0014577 A1 | 2/2002 | Ulrich et al. |
| 2002/0035515 A1 | 3/2002 | Moreno |
| 2002/0046122 A1 | 4/2002 | Barber |
| 2002/0067184 A1 | 6/2002 | Smith et al. |
| 2002/0087413 A1 | 7/2002 | Mahaffy et al. |
| 2002/0112177 A1 | 8/2002 | Voltmer |
| 2002/0129170 A1 | 9/2002 | Moore et al. |
| 2002/0147656 A1 | 10/2002 | Tam |
| 2002/0157033 A1 | 10/2002 | Cox |
| 2002/0162966 A1 | 11/2002 | Yoder |
| 2002/0186878 A1 | 12/2002 | Hoon et al. |
| 2003/0006277 A1 | 1/2003 | Maskatiya et al. |
| 2003/0018897 A1 | 1/2003 | Bellis, Jr. et al. |
| 2003/0025476 A1 | 2/2003 | Trela |
| 2003/0036866 A1 | 2/2003 | Nair et al. |
| 2003/0061150 A1 | 3/2003 | Kocher et al. |
| 2003/0063527 A1 | 4/2003 | Ostwald |
| 2003/0083983 A1 | 5/2003 | Fisher |
| 2003/0100707 A1 | 5/2003 | Hwang et al. |
| 2003/0146898 A1 | 8/2003 | Kawasaki et al. |
| 2003/0158789 A1 | 8/2003 | Miura et al. |
| 2003/0179371 A1 | 9/2003 | Rangarajan et al. |
| 2003/0191675 A1 | 10/2003 | Murashita |
| 2003/0197782 A1 | 10/2003 | Ashe |
| 2003/0204289 A1 | 10/2003 | Banerjee et al. |
| 2004/0012825 A1 | 1/2004 | Tesavis |
| 2004/0039639 A1 | 2/2004 | Walker |
| 2004/0088231 A1 | 5/2004 | Davis |
| 2004/0114153 A1 | 6/2004 | Andersen et al. |
| 2004/0141320 A1 | 7/2004 | Bock et al. |
| 2004/0150815 A1 | 8/2004 | Sones et al. |
| 2004/0156557 A1 | 8/2004 | Van Der Weij |
| 2004/0156667 A1 | 8/2004 | Van Der Weij et al. |
| 2004/0184651 A1 | 9/2004 | Nordbryhn |
| 2004/0186744 A1 | 9/2004 | Lux |
| 2004/0189812 A1 | 9/2004 | Gustavsson |
| 2004/0200902 A1 | 10/2004 | Ishioroshi |
| 2004/0205015 A1 | 10/2004 | DeLaCruz |
| 2004/0235513 A1 | 11/2004 | O'Connell |
| 2004/0242216 A1 | 12/2004 | Boutsikakis |
| 2004/0243478 A1 | 12/2004 | Walker et al. |
| 2004/0262521 A1 | 12/2004 | Devitt et al. |
| 2005/0022699 A1 | 2/2005 | Goza |
| 2005/0027622 A1 | 2/2005 | Walker et al. |
| 2005/0043897 A1 | 2/2005 | Meyer |
| 2005/0109841 A1 | 5/2005 | Ryan et al. |
| 2005/0128551 A1 | 6/2005 | Yang |
| 2005/0135917 A1 | 6/2005 | Kauppila et al. |
| 2005/0137942 A1 | 6/2005 | LaFluer |
| 2005/0139661 A1 | 6/2005 | Eglen et al. |
| 2005/0143149 A1 | 6/2005 | Becker et al. |
| 2005/0167620 A1 | 8/2005 | Cho et al. |
| 2005/0187657 A1 | 8/2005 | Hashimoto et al. |
| 2005/0216120 A1 | 9/2005 | Rosenberg et al. |
| 2005/0222690 A1 | 10/2005 | Wang et al. |
| 2005/0231595 A1 | 10/2005 | Wang et al. |
| 2005/0240958 A1 | 10/2005 | Nguyen et al. |
| 2006/0022827 A1 | 2/2006 | Higham |
| 2006/0038114 A9 | 2/2006 | Cofer et al. |
| 2006/0047573 A1 | 3/2006 | Mitchell et al. |
| 2006/0074756 A1 | 4/2006 | Boykin |
| 2006/0085158 A1 | 4/2006 | Cakiner |
| 2006/0167580 A1 | 7/2006 | Whittier |
| 2006/0184379 A1 | 8/2006 | Tan et al. |
| 2006/0195384 A1 | 8/2006 | Bauer et al. |
| 2006/0217152 A1 | 9/2006 | Fok et al. |
| 2006/0219776 A1 | 10/2006 | Finn |
| 2006/0229108 A1 | 10/2006 | Cehelnik |
| 2006/0230013 A1 | 10/2006 | Hrle |
| 2006/0235747 A1 | 10/2006 | Hammond et al. |
| 2006/0258008 A1 | 11/2006 | Holler et al. |
| 2006/0261931 A1 | 11/2006 | Cheng et al. |
| 2006/0271431 A1 | 11/2006 | Wehr et al. |
| 2006/0279307 A1 | 12/2006 | Wang et al. |
| 2006/0280356 A1 | 12/2006 | Yamagashi |

(56) References Cited

U.S. PATENT DOCUMENTS

| | | |
|---|---|---|
| 2006/0287929 A1 | 12/2006 | Bae et al. |
| 2007/0012665 A1 | 1/2007 | Nelson |
| 2007/0013124 A1 | 1/2007 | Graef et al. |
| 2007/0013139 A1 | 1/2007 | Kumagai |
| 2007/0032098 A1 | 2/2007 | Bowles et al. |
| 2007/0050083 A1 | 3/2007 | Signorelli |
| 2007/0057815 A1 | 3/2007 | Foy et al. |
| 2007/0129906 A1 | 6/2007 | Stoecker et al. |
| 2007/0133844 A1 | 6/2007 | Waehner et al. |
| 2007/0140310 A1 | 6/2007 | Rolton et al. |
| 2007/0150403 A1 | 6/2007 | Mock et al. |
| 2007/0205751 A1 | 9/2007 | Suzuki et al. |
| 2007/0258085 A1 | 11/2007 | Robbins |
| 2007/0263099 A1 | 11/2007 | Motta et al. |
| 2007/0269099 A1 | 11/2007 | Nishino et al. |
| 2007/0271194 A1 | 11/2007 | Walker |
| 2007/0276911 A1 | 11/2007 | Bhumkar |
| 2007/0281734 A1 | 12/2007 | Mizrachi |
| 2007/0282999 A1 | 12/2007 | Tu et al. |
| 2008/0004828 A1 | 1/2008 | Mizrachi |
| 2008/0027581 A1 | 1/2008 | Saether et al. |
| 2008/0033596 A1 | 2/2008 | Fausak et al. |
| 2008/0109746 A1 | 5/2008 | Mayer |
| 2008/0111989 A1 | 5/2008 | Dufour et al. |
| 2008/0133432 A1 | 6/2008 | Ramseyer |
| 2008/0149720 A1 | 6/2008 | Colville |
| 2008/0167578 A1 | 7/2008 | Bryer et al. |
| 2008/0177598 A1 | 7/2008 | Davie |
| 2008/0207198 A1 | 8/2008 | Juric |
| 2008/0228582 A1 | 9/2008 | Fordyce |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0260235 A1 | 10/2008 | Cai et al. |
| 2008/0277467 A1 | 11/2008 | Carlson |
| 2008/0281691 A1 | 11/2008 | Pearson et al. |
| 2008/0296374 A1 | 12/2008 | Gonen et al. |
| 2008/0303915 A1 | 12/2008 | Omi |
| 2008/0306701 A1 | 12/2008 | Zhong et al. |
| 2009/0051907 A1 | 2/2009 | Li et al. |
| 2009/0078775 A1 | 3/2009 | Giebel et al. |
| 2009/0079388 A1 | 3/2009 | Reddy |
| 2009/0095047 A1 | 4/2009 | Patel et al. |
| 2009/0108015 A1 | 4/2009 | Kreamer |
| 2009/0114716 A1 | 5/2009 | Ramachandran |
| 2009/0132813 A1 | 5/2009 | Schibuk |
| 2009/0145727 A1 | 6/2009 | Johns |
| 2009/0156199 A1 | 6/2009 | Steenstra et al. |
| 2009/0160668 A1 | 6/2009 | Crowley et al. |
| 2009/0177319 A1 | 7/2009 | Garibaldi et al. |
| 2009/0184865 A1 | 7/2009 | Valo et al. |
| 2009/0187491 A1 | 7/2009 | Bull et al. |
| 2009/0190142 A1 | 7/2009 | Taylor et al. |
| 2009/0191931 A1 | 7/2009 | Peck |
| 2009/0207743 A1 | 8/2009 | Huq et al. |
| 2009/0244285 A1 | 10/2009 | Chathukutty |
| 2009/0247133 A1 | 10/2009 | Holmen et al. |
| 2009/0248883 A1 | 10/2009 | Suryanarayana et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2009/0322706 A1 | 12/2009 | Austin |
| 2010/0005004 A1 | 1/2010 | Hudak et al. |
| 2010/0051695 A1 | 3/2010 | Yepez et al. |
| 2010/0063894 A1 | 3/2010 | Lundy |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0162359 A1 | 6/2010 | Casey et al. |
| 2010/0169231 A1* | 7/2010 | Bowles .............. G06Q 30/0237 705/308 |
| 2010/0174596 A1 | 7/2010 | Gilman |
| 2010/0185506 A1 | 7/2010 | Wolff |
| 2010/0219234 A1 | 9/2010 | Forbes |
| 2010/0235198 A1 | 9/2010 | Fini et al. |
| 2010/0237854 A1 | 9/2010 | Kumhyr et al. |
| 2010/0260271 A1 | 10/2010 | Kapoor |
| 2010/0262481 A1 | 10/2010 | Baker et al. |
| 2010/0268792 A1 | 10/2010 | Butler |
| 2010/0312639 A1 | 12/2010 | Mastronardi |
| 2011/0035322 A1 | 2/2011 | Lively |
| 2011/0043628 A1 | 2/2011 | Yun |
| 2011/0047022 A1 | 2/2011 | Walker |
| 2011/0055322 A1 | 3/2011 | Gregersen |
| 2011/0060641 A1 | 3/2011 | Grossman et al. |
| 2011/0066514 A1 | 3/2011 | Maraz |
| 2011/0067520 A1 | 3/2011 | Ihrke et al. |
| 2011/0082734 A1 | 4/2011 | Zhang et al. |
| 2011/0099264 A1 | 4/2011 | Chapin et al. |
| 2011/0113479 A1 | 5/2011 | Ganem |
| 2011/0173576 A1 | 7/2011 | Murphy et al. |
| 2011/0191861 A1 | 8/2011 | Spears |
| 2011/0295417 A1 | 12/2011 | Smith, III |
| 2011/0296339 A1 | 12/2011 | Kang |
| 2011/0296508 A1 | 12/2011 | Os et al. |
| 2011/0313840 A1 | 12/2011 | Mason et al. |
| 2012/0004761 A1 | 1/2012 | Madruga |
| 2012/0016518 A1 | 1/2012 | Saario et al. |
| 2012/0022965 A1 | 1/2012 | Seergy |
| 2012/0026582 A1 | 2/2012 | Okabe et al. |
| 2012/0029985 A1 | 2/2012 | Wilson et al. |
| 2012/0030097 A1 | 2/2012 | Hagan et al. |
| 2012/0030399 A1 | 2/2012 | Ben-Harosh |
| 2012/0054113 A1 | 3/2012 | Jayaraman et al. |
| 2012/0063501 A1 | 3/2012 | Aguren |
| 2012/0078413 A1 | 3/2012 | Baker |
| 2012/0095875 A1 | 4/2012 | Guthrie |
| 2012/0116928 A1 | 5/2012 | Gventer |
| 2012/0116929 A1 | 5/2012 | Gventer |
| 2012/0117001 A1 | 5/2012 | Gventer et al. |
| 2012/0127307 A1 | 5/2012 | Hassenzahl |
| 2012/0146956 A1 | 6/2012 | Jenkinson |
| 2012/0209783 A1 | 8/2012 | Smith et al. |
| 2012/0235812 A1 | 9/2012 | Mello et al. |
| 2012/0254046 A1 | 10/2012 | Librizzi et al. |
| 2012/0263394 A1 | 10/2012 | Fujiwara et al. |
| 2012/0280934 A1 | 11/2012 | Ha |
| 2012/0301009 A1 | 11/2012 | Dabic |
| 2012/0303431 A1 | 11/2012 | Phillips et al. |
| 2013/0006713 A1 | 1/2013 | Haake |
| 2013/0034305 A1 | 2/2013 | Jahanshahi et al. |
| 2013/0041508 A1 | 2/2013 | Hu et al. |
| 2013/0046611 A1 | 2/2013 | Bowles et al. |
| 2013/0046699 A1 | 2/2013 | Bowles et al. |
| 2013/0073376 A1 | 3/2013 | Heath |
| 2013/0112440 A1 | 5/2013 | Alsaif et al. |
| 2013/0124426 A1 | 5/2013 | Bowles et al. |
| 2013/0126741 A1 | 5/2013 | Srivastava et al. |
| 2013/0137376 A1 | 5/2013 | Fitzgerald et al. |
| 2013/0138528 A1 | 5/2013 | McAlhaney |
| 2013/0144797 A1 | 6/2013 | Bowles et al. |
| 2013/0155061 A1 | 6/2013 | Jahanshahi et al. |
| 2013/0159119 A1 | 6/2013 | Henderson et al. |
| 2013/0169413 A1 | 7/2013 | Schuessler |
| 2013/0173430 A1 | 7/2013 | Benjamin |
| 2013/0173434 A1 | 7/2013 | Hartman |
| 2013/0181935 A1 | 7/2013 | McKenzie et al. |
| 2013/0198089 A1 | 8/2013 | Bowles |
| 2013/0198144 A1 | 8/2013 | Bowles |
| 2013/0200912 A1 | 8/2013 | Panagas |
| 2013/0246211 A1 | 9/2013 | Sullivan |
| 2013/0246212 A1 | 9/2013 | Sullivan |
| 2013/0253700 A1 | 9/2013 | Carson et al. |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0006451 A1 | 1/2014 | Mullis et al. |
| 2014/0012643 A1 | 1/2014 | Behrisch |

(56) References Cited

U.S. PATENT DOCUMENTS

| | | |
|---|---|---|
| 2014/0028449 A1 | 1/2014 | Sigal et al. |
| 2014/0038556 A1 | 2/2014 | DeSousa |
| 2014/0046748 A1 | 2/2014 | Nagarajan |
| 2014/0046845 A1 | 2/2014 | Dogin et al. |
| 2014/0052329 A1 | 2/2014 | Amirpour |
| 2014/0067710 A1 | 3/2014 | Gventer et al. |
| 2014/0080550 A1 | 3/2014 | Ino et al. |
| 2014/0143161 A1 | 5/2014 | Ahn |
| 2014/0147004 A1 | 5/2014 | Uchida |
| 2014/0149201 A1 | 5/2014 | Abbott |
| 2014/0150100 A1 | 5/2014 | Gupta et al. |
| 2014/0156883 A1 | 6/2014 | Bowles |
| 2014/0178029 A1 | 6/2014 | Raheman et al. |
| 2014/0214505 A1 | 7/2014 | Shuster-Arechiga et al. |
| 2014/0235258 A1 | 8/2014 | Wang et al. |
| 2014/0244315 A1 | 8/2014 | Cahill et al. |
| 2014/0267691 A1 | 9/2014 | Humphrey |
| 2014/0273245 A1 | 9/2014 | Ochranek et al. |
| 2014/0278244 A1 | 9/2014 | Humphrey et al. |
| 2014/0297368 A1 | 10/2014 | Ferder |
| 2014/0316561 A1 | 10/2014 | Tkachenko |
| 2014/0330685 A1 | 11/2014 | Nazzari |
| 2014/0347473 A1 | 11/2014 | Wolff et al. |
| 2015/0006281 A1 | 1/2015 | Takahashi |
| 2015/0046343 A1 | 2/2015 | Martini |
| 2015/0066677 A1 | 3/2015 | Bowles et al. |
| 2015/0073590 A1 | 3/2015 | Garcia |
| 2015/0088698 A1 | 3/2015 | Ackerman |
| 2015/0088731 A1 | 3/2015 | Ackerman |
| 2015/0105901 A1 | 4/2015 | Joshi |
| 2015/0120485 A1 | 4/2015 | Nash |
| 2015/0161714 A1 | 6/2015 | Fainshtein |
| 2015/0170237 A1 | 6/2015 | Powell |
| 2015/0177330 A1 | 6/2015 | Morris |
| 2015/0193797 A1 | 7/2015 | Gerrity |
| 2015/0206200 A1* | 7/2015 | Edmondson ....... G06Q 30/0201 705/306 |
| 2015/0249353 A1 | 9/2015 | Hamilton |
| 2015/0278529 A1 | 10/2015 | Cho et al. |
| 2015/0293860 A9 | 10/2015 | Bowles |
| 2015/0294278 A1 | 10/2015 | Nguyen |
| 2015/0309912 A1 | 10/2015 | Nguyen et al. |
| 2015/0317619 A1 | 11/2015 | Curtis |
| 2015/0324761 A1 | 11/2015 | Nguyen et al. |
| 2015/0324870 A1 | 11/2015 | Nguyen et al. |
| 2015/0332206 A1 | 11/2015 | Trew et al. |
| 2015/0356637 A1* | 12/2015 | Graffia, II ............. G06Q 20/405 705/306 |
| 2016/0019607 A1 | 1/2016 | Burmester et al. |
| 2016/0019685 A1 | 1/2016 | Nguyen et al. |
| 2016/0055392 A1 | 2/2016 | Nakano |
| 2016/0078434 A1 | 3/2016 | Huxham et al. |
| 2016/0087381 A1 | 3/2016 | Wong et al. |
| 2016/0092849 A1 | 3/2016 | Cirannek et al. |
| 2016/0125612 A1 | 5/2016 | Seki et al. |
| 2016/0171544 A1 | 6/2016 | Heminger et al. |
| 2016/0171575 A1 | 6/2016 | Bowles et al. |
| 2016/0184990 A1 | 6/2016 | Song et al. |
| 2016/0210648 A1 | 7/2016 | Cirannek et al. |
| 2016/0253861 A1 | 9/2016 | Seo |
| 2016/0269401 A1 | 9/2016 | Saito et al. |
| 2016/0269895 A1 | 9/2016 | Soini et al. |
| 2016/0275460 A1 | 9/2016 | Ploetner et al. |
| 2016/0275518 A1 | 9/2016 | Bowles et al. |
| 2016/0292710 A1 | 10/2016 | Casselle |
| 2016/0301786 A1 | 10/2016 | Koltsov et al. |
| 2016/0328684 A1 | 11/2016 | Bowles et al. |
| 2016/0379287 A1 | 12/2016 | Dabiri |
| 2017/0011374 A1 | 1/2017 | McDivitt |
| 2017/0083886 A1 | 3/2017 | Silva et al. |
| 2017/0091823 A1 | 3/2017 | Adinarayan et al. |
| 2017/0110902 A1 | 4/2017 | Miller |
| 2017/0115235 A1 | 4/2017 | Ohlsson et al. |
| 2017/0142484 A1 | 5/2017 | Jeon |
| 2017/0169401 A1 | 6/2017 | Beane et al. |
| 2017/0278191 A1 | 9/2017 | Tassone et al. |
| 2017/0301010 A1 | 10/2017 | Bowles et al. |
| 2017/0323279 A1 | 11/2017 | Dion et al. |
| 2018/0084094 A1 | 3/2018 | Sinha et al. |
| 2018/0157246 A1 | 6/2018 | Huang et al. |
| 2018/0255047 A1 | 9/2018 | Cicchitto |
| 2018/0365744 A1 | 12/2018 | Lennon |
| 2019/0066439 A1 | 2/2019 | Pinkus |
| 2020/0090137 A1 | 3/2020 | Bowles et al. |
| 2020/0202319 A1 | 6/2020 | Forutanpour et al. |
| 2020/0265487 A1 | 8/2020 | Forutanpour et al. |
| 2020/0286030 A1 | 9/2020 | Hewett |
| 2020/0342442 A1 | 10/2020 | Curtis |
| 2021/0081914 A1 | 3/2021 | Nelms et al. |
| 2021/0110366 A1 | 4/2021 | Dion et al. |
| 2021/0174312 A1 | 6/2021 | Bowles et al. |
| 2021/0192484 A1 | 6/2021 | Forutanpour et al. |
| 2021/0224867 A1 | 7/2021 | Bordeleau et al. |
| 2021/0295494 A1 | 9/2021 | Forutanpour et al. |
| 2022/0027879 A1 | 1/2022 | Bowles et al. |
| 2022/0051212 A1 | 2/2022 | Forutanpour et al. |
| 2022/0051300 A1 | 2/2022 | Forutanpour et al. |
| 2022/0051301 A1 | 2/2022 | Forutanpour et al. |
| 2022/0051507 A1 | 2/2022 | Forutanpour et al. |
| 2022/0067798 A1 | 3/2022 | Forutanpour et al. |
| 2022/0068076 A1 | 3/2022 | Forutanpour et al. |
| 2022/0114854 A1 | 4/2022 | Forutanpour et al. |
| 2022/0172178 A1 | 6/2022 | Forutanpour et al. |
| 2022/0284406 A1 | 9/2022 | Hunt et al. |
| 2022/0292464 A1 | 9/2022 | Silva et al. |
| 2022/0318774 A1 | 10/2022 | Bowles |
| 2023/0007937 A1 | 1/2023 | Forutanpour et al. |
| 2023/0051060 A1 | 2/2023 | Nitu |
| 2023/0077844 A1 | 3/2023 | Bowles et al. |
| 2023/0100849 A1 | 3/2023 | Bowles et al. |
| 2023/0196865 A1 | 6/2023 | Forutanpour et al. |
| 2023/0274346 A1 | 8/2023 | Bowles et al. |
| 2023/0297973 A1 | 9/2023 | Bowles et al. |
| 2023/0297974 A1 | 9/2023 | Bowles et al. |
| 2023/0306384 A1 | 9/2023 | Bowles et al. |
| 2024/0005289 A1 | 1/2024 | Silva et al. |
| 2024/0249251 A1 | 7/2024 | Bowles |
| 2024/0265470 A1 | 8/2024 | Bowles et al. |
| 2024/0289753 A1 | 8/2024 | Bowles |
| 2024/0346463 A1 | 10/2024 | Hunt et al. |

FOREIGN PATENT DOCUMENTS

| | | |
|---|---|---|
| CA | 2866147 | 9/2013 |
| CN | 1574437 | 2/2005 |
| CN | 2708415 | 7/2005 |
| CN | 1864088 | 11/2006 |
| CN | 1957320 | 5/2007 |
| CN | 2912132 | 6/2007 |
| CN | 200965706 | 10/2007 |
| CN | 101176124 | 5/2008 |
| CN | 101379488 A | 3/2009 |
| CN | 201956656 U | 8/2011 |
| CN | 102315630 A | 1/2012 |
| CN | 102467728 A | 5/2012 |
| CN | 202351953 | 7/2012 |
| CN | 202353475 U | 7/2012 |
| CN | 102654927 | 8/2012 |
| CN | 202394296 | 8/2012 |
| CN | 102682597 A | 9/2012 |
| CN | 202564711 U | 11/2012 |
| CN | 202585951 U | 12/2012 |
| CN | 202702438 U | 1/2013 |
| CN | 202711369 U | 1/2013 |
| CN | 102930642 | 2/2013 |
| CN | 102976004 | 3/2013 |
| CN | 103198562 | 7/2013 |
| CN | 103226870 | 7/2013 |
| CN | 203242065 | 10/2013 |
| CN | 103440607 | 12/2013 |
| CN | 103514641 | 1/2014 |
| CN | 103544772 | 1/2014 |
| CN | 203408902 | 1/2014 |
| CN | 103662541 | 3/2014 |

(56) References Cited

FOREIGN PATENT DOCUMENTS

| | | |
|---|---|---|
| CN | 103679147 A | 3/2014 |
| CN | 203520502 | 4/2014 |
| CN | 103824387 A | 5/2014 |
| CN | 203588366 U | 5/2014 |
| CN | 103843040 | 6/2014 |
| CN | 103954626 | 7/2014 |
| CN | 302944037 S | 9/2014 |
| CN | 302944252 S | 9/2014 |
| CN | 302944253 S | 9/2014 |
| CN | 303042750 S | 12/2014 |
| CN | 105488702 A | 4/2016 |
| CN | 205129815 U | 4/2016 |
| CN | 205132514 U | 4/2016 |
| CN | 205140067 U | 4/2016 |
| CN | 105444678 B | 3/2018 |
| DE | 10031532 | 10/2001 |
| EP | 0116970 | 12/1991 |
| EP | 0654003 | 5/1995 |
| EP | 1168253 | 1/2002 |
| EP | 1270905 | 1/2003 |
| EP | 1703436 | 9/2006 |
| EP | 2701450 | 2/2014 |
| EP | 2428072 | 1/2018 |
| JP | H7334583 | 12/1995 |
| JP | H11242005 | 9/1999 |
| JP | H11334851 | 12/1999 |
| JP | 2000121564 | 4/2000 |
| JP | 2000171409 A | 6/2000 |
| JP | 2000180371 | 6/2000 |
| JP | 3123095 | 1/2001 |
| JP | 2001312766 | 11/2001 |
| JP | 2002019147 | 1/2002 |
| JP | 2002183286 | 6/2002 |
| JP | 2002259528 | 9/2002 |
| JP | 2002302252 | 10/2002 |
| JP | 2002324264 | 11/2002 |
| JP | 2002358354 | 12/2002 |
| JP | 2003139516 | 5/2003 |
| JP | 2003230229 | 8/2003 |
| JP | 2003242243 | 8/2003 |
| JP | 2003264007 | 9/2003 |
| JP | 2003267509 | 9/2003 |
| JP | 2004021569 | 1/2004 |
| JP | 2004191496 | 7/2004 |
| JP | 2004226129 | 8/2004 |
| JP | 2004239850 | 8/2004 |
| JP | 2004288143 | 10/2004 |
| JP | 2004303102 | 10/2004 |
| JP | 2004341681 | 12/2004 |
| JP | 2005063203 | 3/2005 |
| JP | 2005122059 | 5/2005 |
| JP | 2005308476 | 11/2005 |
| JP | 2006127308 | 5/2006 |
| JP | 2006195814 | 7/2006 |
| JP | 2006203451 | 8/2006 |
| JP | 2006227764 | 8/2006 |
| JP | 2006260246 | 9/2006 |
| JP | 2007141266 | 6/2007 |
| JP | 2007155455 | 6/2007 |
| JP | 2007179516 | 7/2007 |
| JP | 2007265340 | 10/2007 |
| JP | 2008045959 | 2/2008 |
| JP | 2008059403 A | 3/2008 |
| JP | 2008522299 | 6/2008 |
| JP | 2008293391 | 12/2008 |
| JP | 2007086725 | 4/2009 |
| JP | 2009175035 | 8/2009 |
| JP | 2009245058 | 10/2009 |
| JP | 2009250971 | 10/2009 |
| JP | 2009290852 | 12/2009 |
| JP | 2010177720 | 8/2010 |
| JP | 2010276896 | 12/2010 |
| JP | 2011518387 | 6/2011 |
| JP | 2012504832 | 2/2012 |
| JP | 2012058932 | 3/2012 |
| JP | 2013033361 | 2/2013 |
| JP | 2013037441 | 2/2013 |
| JP | 2014513829 A | 6/2014 |
| JP | 2015505999 A | 2/2015 |
| JP | 2016504900 | 2/2016 |
| JP | 2017040957 A | 2/2017 |
| JP | 2017093938 | 6/2017 |
| JP | 2017201559 | 11/2017 |
| JP | 2018520453 A | 7/2018 |
| JP | 2019012474 | 1/2019 |
| JP | 2019513262 A | 5/2019 |
| KR | 20000064168 | 11/2000 |
| KR | 20010074614 | 8/2001 |
| KR | 20010097567 | 11/2001 |
| KR | 100766860 | 10/2007 |
| KR | 20130085255 | 7/2013 |
| KR | 101326680 | 11/2013 |
| KR | 101329949 | 11/2013 |
| KR | 20140037543 | 3/2014 |
| KR | 101599251 | 3/2016 |
| WO | WO8503790 | 8/1985 |
| WO | WO2001015096 | 3/2001 |
| WO | WO2002005176 | 1/2002 |
| WO | WO0221090 | 3/2002 |
| WO | WO2002025613 | 3/2002 |
| WO | WO2002039357 | 5/2002 |
| WO | WO2003012717 | 2/2003 |
| WO | WO2003014994 | 2/2003 |
| WO | WO2004021114 | 3/2004 |
| WO | WO2004114490 | 12/2004 |
| WO | WO2005008566 | 1/2005 |
| WO | 2005054877 | 6/2005 |
| WO | WO2005101346 | 10/2005 |
| WO | WO2006021825 | 3/2006 |
| WO | WO2006058601 | 6/2006 |
| WO | WO2006080851 | 8/2006 |
| WO | WO2007066166 | 6/2007 |
| WO | WO2009089607 | 7/2009 |
| WO | WO2009128173 | 10/2009 |
| WO | WO2009128176 | 10/2009 |
| WO | WO2009129526 | 10/2009 |
| WO | WO2010040116 | 4/2010 |
| WO | WO2010128267 | 11/2010 |
| WO | WO2010128315 | 11/2010 |
| WO | WO2011131016 | 10/2011 |
| WO | WO2012073126 | 6/2012 |
| WO | WO2013002748 | 1/2013 |
| WO | WO2013074819 | 5/2013 |
| WO | 2014033350 | 3/2014 |
| WO | WO2014075055 | 5/2014 |
| WO | WO2014141180 | 9/2014 |
| WO | WO2015022409 | 2/2015 |
| WO | WO2015093676 | 6/2015 |
| WO | WO2015108864 | 7/2015 |
| WO | WO2016181224 | 11/2016 |
| WO | 2016196175 A1 | 12/2016 |
| WO | WO2015196175 | 12/2016 |
| WO | WO2017034441 | 3/2017 |
| WO | WO2017081527 | 5/2017 |
| WO | 2018003026 A1 | 1/2018 |

OTHER PUBLICATIONS

3GPP Organizational Partners, "3rd Generation Partnership Project; Technical Specification Group Terminals; AT command set for GSM Mobile Equipment (ME)," Global System for Mobile Communications, 1998, 124 pages.

Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.

Altec Lansing User's Guide 2007, 8 pages.

Appeal filed Aug. 11, 2020 in U.S. Appl. No. 14/967,183, 25 pages.

Appeal filed Dec. 16, 2019 in U.S. Appl. No. 14/966,346, 31 pages.

Appeal Reply filed Nov. 16, 2020 in U.S. Appl. No. 14/967,183, 8 pages.

Bhule et al., "Environmental and economic trade-offs in consumer electronic products recycling: a case study of cell phones and

(56) References Cited

OTHER PUBLICATIONS computers," IEEE International Symposium on Electronics and the Environment, Conference Record, 2004.
Bournique, D.: "Mobile Karma Shuts Down as iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.
Business Wire, "The World's First Office Photography Machine" at CES 2008 Launched by Ortery Technologies, Jan. 7, 2008, 3 pages.
CNET, "Tackling LCD "burn ins", and dead/stick Pixels", published Sep. 2, 2009, retrieved from http://www.cnet.com/news/tackling-LCD-burn-ins-and-deadstuck-pixels/.
Cybercom Group Europe AB, "OMSI Forum," Downloads, 2005, 2 pages.
Cybercom Group Europe AB, "OMSI Provides Easy Service and Maintenance for Mobile Phones," Press Release, 2005, 1 page.
Cybercom Group Europe AB, "The OMSI 2.0 Interface Supports," OMSI 2.0 Description, available at least before Oct. 2008, 1 page.
Cybercom Group, "Leading Telecom Organisations Draft IDS 10/26ress Device Management Issues," Press Release, 2007, 1 page.
Evgenii Masunov, Mar. 25, 2010, http://www.appleinsider.ru/news/ipone-obladaet-luchshim-tachskrinom-provereno_robotom.html, 4 pages.
Examiner's Answer to Appeal Brief mailed Sep. 16, 2020 in U.S. Appl. No. 14/967,183, 7 pages.
Final Office Action mailed Dec. 21, 2018 in U.S. Appl. No. 14/925,357, 34 pages.
Final Office Action mailed Feb. 15, 2019 in U.S. Appl. No. 14/966,346, 17 pages.
Final Office Action mailed Feb. 3, 2022 in U.S. Appl. No. 17/086,357, 20 pages.
Final Office Action mailed Jan. 29, 2020 in U.S. Appl. No. 14/934,134, 81 pages.
Final Office Action mailed May 16, 2019 in U.S. Appl. No. 14/967,183, 25 pages.
Final Office Action mailed May 19, 2021 in U.S. Appl. No. 16/601,492, 20 pages.
Final Office Action Response dated Nov. 10, 2021 in U.S. Appl. No. 16/601,492, 20 pages.
Final Office Action Response filed Apr. 22, 2019 in U.S. Appl. No. 14/925,357, 18 pages.
Final Office Action Response filed Aug. 14, 2019 in U.S. Appl. No. 14/966,346, 17 pages.
Final Office Action Response filed Jun. 29, 2020 in U.S. Appl. No. 14/934,134, 43 pages.
Final Office Action Response filed May 26, 2022 in U.S. Appl. No. 17/086,357, 29 pages.
Final Office Action Response filed Nov. 15, 2019 in U.S. Appl. No. 14/967,183, 21 pages.
Foster et al., "Automated Visual Inspection: A Tutorial" 1990 Computers Ind. Engng. vol. 18(4): 493-504.
Geekanoids, You Tube Video, "Apple iphone 3GS Unboxing and Review", uploaded on Jun. 19, 2009, retrieved from http://www.youtube.com/watch?v=GCEi9QAeDqk on Sep. 2, 2009.
Geyer et al. "The economics of cell phone reuse and recylcing," The International Journal of Advanced Manufacturing Technology, 47(5): 515-525, 2010.
Graffia et al., "Retail Station for E-Device Identification, Assessment, and Trade-In", Jun. 6, 2014 (Drawings and Specification) (Year: 2014).
GSM Arena Glossary, "LCD (Liquid Crystal Display", retrieved from http://www.gsmarena.com/glossary.php3?term=lcd on Apr. 28, 2016, 1 page.
International Numbering Plan. Retrieved on Apr. 5, 2013 at <http://web.archive.org/web/20070322214125/http://www.numberingplans.com/?page+analysis&sub+imeinr>, 2 pages.
International Search Report and Written Opinion mailed Dec. 14, 2015 in International Application No. PCT/US2015/057802, 11 pages.
International Search Report and Written Opinion mailed Jan. 12, 2016 in International Application No. PCT/US2015/059351, 11 pages.
International Search Report and Written Opinion mailed Mar. 3, 2016 in International Application No. PCT/US2015/065226, 11 pages.
International Search Report and Written Opinion mailed Mar. 3, 2017 in International Application No. PCT/US2016/065801, 12 pages.
Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].
Kanter, James Max, "Color Crack:Identifying Cracks in Glass," dated Dec. 9, 2014; retrieved from the internet http://www.jmaxkanter.com/static/papers/color_crack.pdf on Sep. 22, 2017.
Lambert, Emily, "Use It Up, Wear It Out", Forbes 175.5 (2005): 77-78. Business Source Complete. Web. Jan. 6, 2015, 3 pages.
Littleton Partners with Donations Ink (Jan. 19, 2006) US Fed News Service, Including US State News. Web. Jan. 6, 2015, 1 page.
MobileGazette.com, "2006 in Review: The Good, the Bad and the Ugly", published Dec. 2006, retrieved from http://www.mobilegazette.com/2006-review-06x12x22.htm on Nov. 11, 2015.
Non-Final Office Action mailed Apr. 14, 2020 in U.S. Appl. No. 14/966,346, 34 pages.
Non-Final Office Action mailed Apr. 26, 2023 in U.S. Appl. No. 17/655,217, 37 pages.
Non-Final Office Action mailed Apr. 27, 2018 in U.S. Appl. No. 14/966,346, 29 pages.
Non-Final Office Action mailed Aug. 6, 2021 in U.S. Appl. No. 17/086,357, 23 pages.
Non-Final Office Action mailed Jan. 10, 2020 in U.S. Appl. No. 14/967,183, 22 pages.
Non-Final Office Action mailed Jul. 26, 2018 in U.S. Appl. No. 14/925,357, 31 pages.
Non-Final Office Action mailed Jul. 27, 2018 in U.S. Appl. No. 14/967,183, 19 pages.
Non-Final Office Action mailed Jul. 8, 2019 in U.S. Appl. No. 14/934,134, 57 pages.
Non-Final Office Action mailed Jun. 22, 2021 in U.S. Appl. No. 16/556,104, 35 pages.
Non-Final Office Action mailed Mar. 30, 2023 in U.S. Appl. No. 17/817,296, 22 pages.
Non-Final Office Action mailed Oct. 6, 2022 in U.S. Appl. No. 17/086,357, 24 pages.
Non-Final Office Action mailed Sep. 17, 2020 in U.S. Appl. No. 16/601,492, 24 pages.
Non-Final Office Action Response filed Dec. 21, 2021 in U.S. Appl. No. 16/556,104, 15 pages.
Non-Final Office Action Response filed Dec. 5, 2021 in U.S. Appl. No. 17/086,357, 10 pages.
Non-Final Office Action Response filed Feb. 11, 2021 in U.S. Appl. No. 16/601,492, 18 pages.
Non-Final Office Action Response filed Jan. 28, 2019 in U.S. Appl. No. 14/967,183, 21 pages.
Non-Final Office Action Response filed Nov. 21, 2018 in U.S. Appl. No. 14/925,357, 20 pages.
Non-Final Office Action Response filed Nov. 8, 2019 in U.S. Appl. No. 14/934,134, 27 pages.
Non-Final Office Action Response filed Oct. 26, 2018 in U.S. Appl. No. 14/966,346, 30 pages.
Non-Final Office Action Response filed Sep. 14, 2020 in U.S. Appl. No. 14/966,346, 16 pages.
Notice of Allowance mailed Apr. 1, 2021 in U.S. Appl. No. 14/966,346, 12 pages.
Notice of Allowance mailed Apr. 4, 2023 in U.S. Appl. No. 17/445,575, 7 pages.
Notice of Allowance mailed Aug. 3, 2020 in U.S. Appl. No. 14/934,134, 17 pages.
Notice of Allowance mailed Dec. 11, 2020 in U.S. Appl. No. 14/966,346, 12 pages.

(56) References Cited

OTHER PUBLICATIONS

Notice of Allowance mailed Dec. 15, 2021 in U.S. Appl. No. 16/601,492, 20 pages.
Notice of Allowance mailed Jan. 28, 2022 in U.S. Appl. No. 16/556,104, 8 pages.
Notice of Allowance mailed May 17, 2022 in U.S. Appl. No. 16/556,104, 8 pages.
Notice of Allowance mailed May 20, 2019 in U.S. Appl. No. 14/925,357, 9 pages.
Notice of Allowance mailed Sep. 10, 2020 in U.S. Appl. No. 14/934,134, 1 pages.
Oliveira, et al., "Automatic crack detection on road imagery using anisotropic diffusion and region linkage," 18th European Signal Processing Conference (EUSIPCO-2010), Aug. 23, 2010, pp. 274-278.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
Perng et al., "A Novel Vision System for CRT Panel Auto-Inspection", Journal of the Chinese Institute of Industrial Engineers, vol. 24, No. 5, pp. 341-350 (2007).
Perng et al., "A Novel Vision System for CRT Panel Auto-Inspection", Proceedings of the 2005 IEEE International Conference on Mechatronics, Jul. 10-12, 2005, pp. 4.
Phifer, "How to Use your 3G Phone as a Wireless Broad Band Modem," Computer Weekly News, 2007, 6 pages.
Rawson, Chris, "Tuaw: 25 Ways to Check the Hardware on Your iphone 4", published Aug. 12, 2010, retrieved at http://www.tuaw.com/2010/08/13/hardware-test-your-iphone-4/ on Feb. 28, 2014.
Rehg et al. "Vision for a Smart Kiosk" IEEE, Computer Society Conference on Computer Vision and Pattern Recognition (1997).
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Rolf Steinhilper "Remanufacturing: The Ultimate Form of Recycling", Fraunhofer IRBVerlag, 1998, parts 1-3, http://www.reman.org/Publications_main.htm.
Romano "Recycling a Phone at EcoATM is an Easy Route to Feeling Green," Xconomy, Jan. 22, 2014, pp. 1-3.
Rosebrock, "How to Build a Kick-Ass Mobile Document Scanner in Just 5 Minutes" PyImage Search, Sep. 2014, 19 pages.
Shotton et al., "Efficiently Combining Contour and Texture Cues for Object Recognition", Proceedings of the British Machine Vision Conference 2008, (Sep. 1, 2008), pp. 7.1-7.10 * abstract *.
Simplysellular, "Get Cash for your Old Cell Phone", published Apr. 2, 2010, retrieved from http://simplysellular.com/conditions.php on Jan. 6, 2015, 2 pages.
Sony Ericsson Mobile Communications AB, "P800/P802," White Paper, 2003, 128 pages.
Sony Ericsson Mobile Communications AB, "T68i/T68ie," White Paper, 2002, 71 pages.
Tecace Software: "Your phone appraisal-Movaluate-Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.
Trading devices for dollars, The Economist (US) 405.8813:8 (US), Economist Intelligence Unit N.A. Incorporated, Dec. 1, 2012.
Turner, "5 MP3 Players for Pumping Up Your Workouts," Mashable.com, Nov. 4, 2010, available online at https://mashable.com/2010/11/04/mp3-players-for-sports/ (Year: 2010).
Waugh, "Phone recycling machine lets you drop in old mobiles—and spits out cash instantly," Daily Mail Online, Jan. 13, 2012, p. 1-2.
Wikipedia, "Machine Vision" Sep. 19, 2009, 6 pages.
Wiley Encyclopedia of Computer Science and Technology (2009).
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Yahoo Answers, "What is a Clean ESN?" published Jun. 23, 2009, retrieved from http://web.archive.org/web/20090623215042/http://answers.yahoo.com/question/inde,8020US?qid=20080318061012AANFRco on Apr. 3, 2014.
Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.
Anderle, Megan, "Verizon's new app aims to make phone recycling easy and profitable", Internet Article, May 1, 2014, XP093222792, retrieved from the Internet: URL: https://www.theguardian.com/sustainable-business/verizon-mobile-phone-recycling-cell-ecoatm.
Appeal Brief filed Oct. 28, 2024 in U.S. Appl. No. 17/086,357, 40 pages.
Appeal Brief filed Sep. 22, 2023 in U.S. Appl. No. 17/086,357, 39 pages.
Examiner's Answer mailed May 8, 2025 in U.S. Appl. No. 18/324,903, p. 13.
Final Office Action mailed Jan. 5, 2024 in U.S. Appl. No. 17/817,296, 27 pages.
Final Office response filed May 13, 2024 in U.S. Appl. No. 17/817,296, 10 pages.
Grose, Thomas; "New Life for Old Phones," ASE Prism 22.3 (2012): 18.
Kuriyan, et al.: "Review of Research on Rural PC Kiosks," Apr. 14, 2007, 22 pages, retrieved at http://research.microsoft.com/research/tem/kiosks.
Nithi et al., "Smart Power Management for Mobile Handsets".
Non-Final Office Action mailed Jan. 29, 2024 in U.S. Appl. No. 17/086,357, 33 pages.
Non-Final Office Action mailed Jun. 16, 2025 in U.S. Appl. No. 18/472,054, p. 10.
Non-Final Office Action mailed Jun. 16, 2025 in U.S. Appl. No. 18/639,420, p. 66.
Non-Final Office Action mailed May 12, 2025 in U.S. Appl. No. 17/811,548.
Non-Final Office Action response filed Sep. 29, 2023 in U.S. Appl. No. 17/817,296, 16 pages.
Non-Final Office response filed Oct. 26, 2023 in U.S. Appl. No. 17/655,217, 14 pages.
Notice of Allowance mailed Apr. 23, 2025 in U.S. Appl. No. 18/437,212, p. 44.
Notice of Allowance mailed Apr. 24, 2025 in U.S. Appl. No. 17/125,994, p. 22.
Notice of Allowance mailed Feb. 8, 2024 in U.S. Appl. No. 17/655,217, 11 pages.
Notice of Allowance mailed Jun. 11, 2024 in U.S. Appl. No. 17/817,296, pp. all.
Notice of Allowance mailed Sep. 18, 2024 in U.S. Appl. No. 17/814,296, pp. all.
Notice of Appeal filed Jun. 28, 2024 in in U.S. Appl. No. 17/086,357, pp. all.
Notice of Appeal filed Mar. 2, 2023 in U.S. Appl. No. 17/086,357, 2 pages.
Novotny, et al.; "Smart City Concept, Applications and Services," Aug. 26, 2014, Journal of Telecommunications System & Management, vol. 3, Issue 2, pp. 1-8, DOI: 10.4172/2167-0919.1000117.
Reply Brief filed Feb. 25, 2025 in U.S. Appl. No. 17/086,357, pp all.
TecAce Software: "Android Smartphone Testing App—Movaluate—TecAce Software | PRLog" Internet Article, May 6, 2013, XP093222769, retrieved from the Internet: URL: https://www.prlog.org/12132313-android-smartphone-testing-app-movaluate.html.
Tuzun, "Usability testing of a 3D touch screen kiosk system for way-finding," Computers in Human Behavior vol. 61, Aug. 2016, pp. 73-79.
Watson; "Review: SanDisk iXpand Wireless Charger" Sep. 15, 2019, 4 pages retrieved at https://www.whatmobile.net/Reviews/article/review-sandisk-ixpand-wireless-charger.

(56) References Cited

OTHER PUBLICATIONS

Shi, "The LOB Recreation Model: Predicting the Limit Order Book from TAQ History Using an Ordinary Differential Equation Recurrent Neural Network" 548-556. The Thirty-Fifth AAAI Conference on Artificial Intelligence. 2021; <DOI: 10.48550/arXiv.2103.01670> abstract; p. 551, 2nd column, 1st paragraph; p. 552, 1st column, 1st paragraph; fig. 3.

* cited by examiner

SYSTEMS AND METHODS FOR RECYCLING CONSUMER ELECTRONIC DEVICES

CROSS-REFERENCE TO RELATED APPLICATION

This application is a continuation of U.S. patent application Ser. No. 14/967,183 filed on Dec. 11, 2015, which is hereby incorporated by reference in its entirety.

TECHNICAL FIELD

The present disclosure is directed generally to systems and methods for recycling consumer electronic devices and, more particularly, to systems and methods for identification, evaluation, exchange, return, and/or purchase of consumer electronic devices.

BACKGROUND

Consumer electronic devices, such as mobile phones, laptop computers, notebooks, tablets, MP3 players, etc., are ubiquitous. Over 300 million desk-based and notebook computers shipped in 2013, and for the first time the number of tablet computers shipped exceeded laptops. In addition, there are over 6 billion mobile devices in use in the world and the number of these devices is growing rapidly with more than 1.8 billion mobile phones being sold in 2013 alone. By 2017 it is expected that there will be more mobile devices in use than there are people on the planet. Part of the reason for the rapid growth in the number of mobile phones and other electronic devices is the rapid pace at which these devices evolve, and the increased usage of such devices in third world countries.

As a result of the rapid pace of development, a relatively high percentage of electronic devices are replaced every year as consumers continually upgrade their electronic devices to obtain the latest features. According to the U.S. Environmental Protection Agency, the U.S. alone disposes of over 370 million mobile phones, PDAs, tablets, and other electronic devices every year. Millions of other outdated or broken electronic devices are simply tossed into junk drawers or otherwise kept until a suitable disposal solution arises.

Although many electronic device retailers now offer mobile phone trade-in or buyback programs, many old devices still end up in landfills or are improperly disassembled and disposed of in developing countries. Unfortunately, however, electronic devices typically contain substances that can be harmful to the environment, such as arsenic, lithium, cadmium, copper, lead, mercury and zinc. If not properly disposed of, these toxic substances can seep into groundwater from decomposing landfills and contaminate the soil with potentiality harmful consequences for humans and the environment.

As an alternative to retailer trade-in or buyback programs, consumers can now recycle and/or sell their used mobile phones and other electronic devices using self-service kiosks located in malls or other publically accessible areas. Such kiosks are operated by ecoATM, Inc., the assignee of the present application, and are disclosed in, for example, U.S. Pat. Nos. 8,463,646, 8,423,404, 8,239,262, 8,200,533, 8,195,511, and 7,881,965; and in U.S. patent application Ser. Nos. 12/573,089, 12/727,624, 13/113,497, 12/785,465, 13/017,560, 13/438,924, 13/753,539, 13/658,825, 13/733,984, 13/705,252, 13/487,299 13/492,835, 13/562,292, 13/658,828, 13/693,032, 13/792,030, 13/794,814, 13/794,816, 13/862,395 and 13/913,408, each of which is incorporated herein by reference in its entirety.

Certain retail establishments and other locations may be reluctant to provide a full-sized kiosk for recycling electronic devices due to the relatively large footprint of the kiosk. Accordingly, there continues to be a need for expanding the means available to consumers for recycling or reselling mobile phones and other consumer electronic devices. Simplifying the recycling and reselling process, enhancing the consumer experience, and discouraging fraud can incentivize consumers to dispose of their old electronic devices in an efficient and environmentally conscientious way.

DETAILED DESCRIPTION

Figure 1:
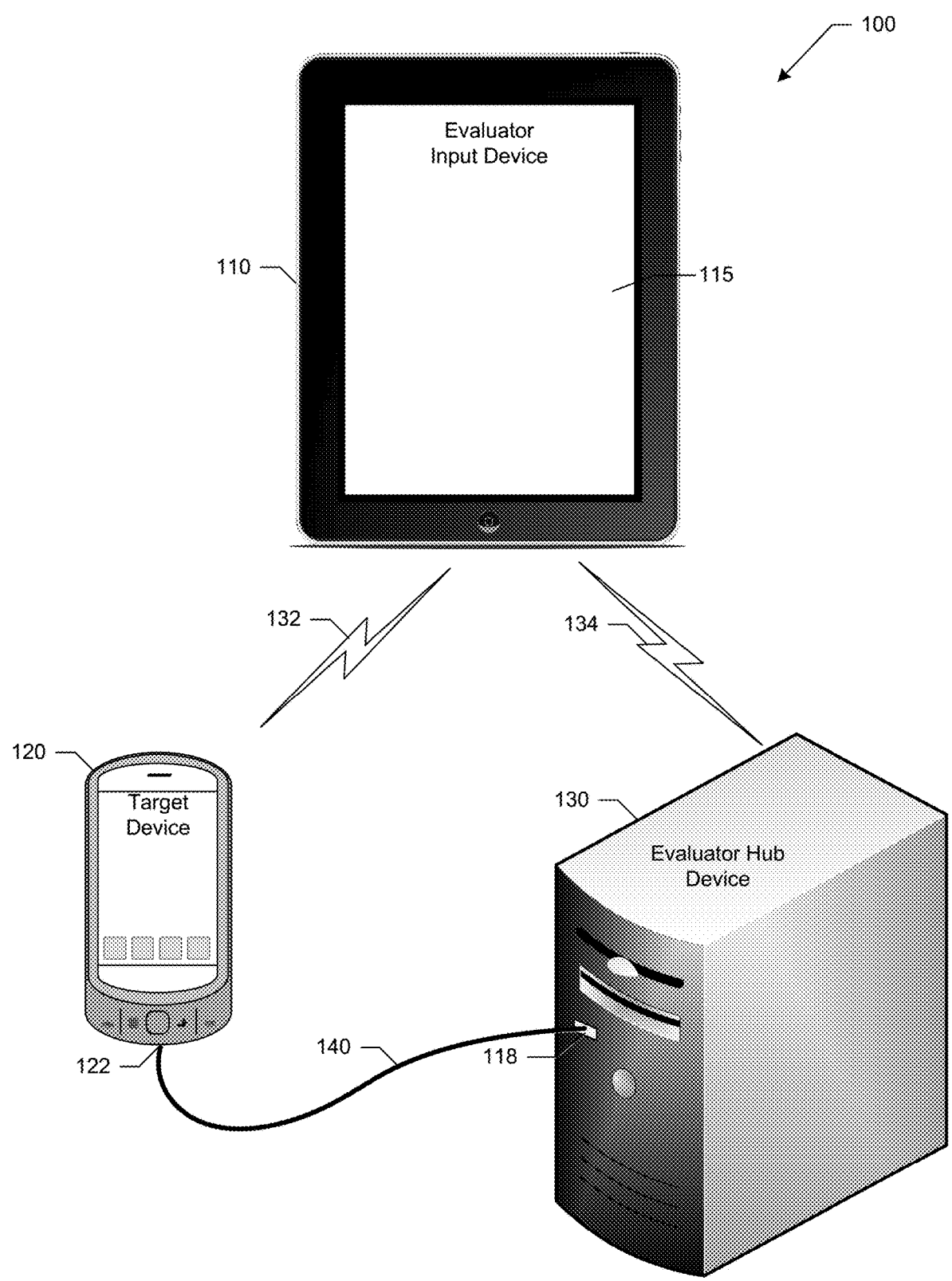
FIG. 1 illustrates an embodiment of a suitable computing environment for implementing various aspects of the present technology.

The following disclosure describes various embodiments of systems and methods for recycling and/or other processing of electronic devices. For example, the following describes various embodiments of systems enabling retail stores to evaluate mobile devices for recycling and repurchase. Retail stores—such as mobile carrier stores—typically include clerks who operate tablets or other computing devices for completing transactions with customers. In some embodiments of the present technology, a retail tablet can run a software application ("app") that enables a clerk to evaluate a customer's mobile device for potential recycling.

For example, the app can direct the clerk to obtain images and/or video of the customer's mobile device using the tablet's built-in camera or other imaging device. The images and/or video can then be transmitted via the app to remote servers where the images and/or video are analyzed either automatically (e.g., using machine vision techniques) or manually (e.g., using remote individuals to view the images and/or video and asses the condition of the mobile device based on the images and/or video). The customer's mobile device can additionally be electrically connected to a device (e.g., an "evaluator hub" device) located within the retail store, for example via a USB cable or other electrical connector. The evaluator hub can then electrically interrogate and evaluate the customer's mobile device. Together the electrical and visual evaluations are utilized to determine an appropriate price to offer the customer in exchange for the customer's mobile device. Some embodiments of this recycling system can be particularly advantageous in that it can make use of tablets or other such handheld devices already in use by store clerks without the need to provide specialized hardware for such handheld devices. In conjunction with the clerk's handheld devices, a stationary evaluator hub device can be provided with hardware and software configured to electrically connect with and evaluate the customer's mobile device. Together, the clerk's handheld device and the evaluator hub device can evaluate and determine an appropriate price for the customer's mobile device.

The various embodiments of the systems and methods described herein for recycling electronic devices can be particularly useful for retailers. For example, such systems may enable retailers to offer recycling of electronic devices without the need for specially trained staff members. Additionally, certain state and federal laws may provide incentives for retailers to participate in "takeback" programs that require manufacturers to assist with recycling of electronic devices. Manufacturers often offer warranties or other guarantees that may require receiving and evaluating electronic devices returned by customers. In some instances, retailers may offer buyback programs in order to promote sales of new products, for example offering a customer $50 towards the purchase of a new mobile phone if the customer brings in an old mobile phone for recycling. In these and other instances, the consumer's electronic device can be returned at a convenient location using various embodiments of the evaluator devices described in detail herein. These embodiments enable the electronic devices to be evaluated, inspected, binned, and compensation to be dispensed to the user. The retailer or other establishment hosting the recycling system may then coordinate with manufacturers or electronics recyclers to pick up the collected electronic devices.

The disclosed technology also includes the disclosures of U.S. patent application Ser. No. 14/498,763, titled "METHODS AND SYSTEMS FOR PRICING AND PERFORMING OTHER PROCESSES ASSOCIATED WITH RECYCLING MOBILE PHONES AND OTHER ELECTRONIC DEVICES," filed by the applicant on Sep. 26, 2014; U.S. patent application Ser. No. 14/500,739, titled "MAINTAINING SETS OF CABLE COMPONENTS USED FOR WIRED ANALYSIS, CHARGING, OR OTHER INTERACTION WITH PORTABLE ELECTRONIC DEVICES," filed by the applicant on Sep. 29, 2014; U.S. provisional application No. 62/059,129, titled "WIRELESS-ENABLED KIOSK FOR RECYCLING CONSUMER DEVICES," filed by the applicant on Oct. 2, 2014; U.S. provisional application No. 62/059,132, titled "APPLICATION FOR DEVICE EVALUATION AND OTHER PROCESSES ASSOCIATED WITH DEVICE RECYCLING," filed by the applicant on Oct. 2, 2014; U.S. patent application Ser. No. 14/506,449, titled "SYSTEM FOR ELECTRICALLY TESTING MOBILE DEVICES AT A CONSUMER-OPERATED KIOSK, AND ASSOCIATED DEVICES AND METHODS," filed by the applicant on Oct. 3, 2014; U.S. provisional application No. 62/073,840, titled "SYSTEMS AND METHODS FOR RECYCLING CONSUMER ELECTRONIC DEVICES," filed by the applicant on Oct. 31, 2014; U.S. provisional application No. 62/073,847, titled "METHODS AND SYSTEMS FOR FACILITATING PROCESSES ASSOCIATED WITH INSURANCE SERVICES AND/OR OTHER SERVICES FOR ELECTRONIC DEVICES," filed by the applicant on Oct. 31, 2014; U.S. provisional application No. 62/090,855, titled "METHODS AND SYSTEMS FOR PROVIDING INFORMATION REGARDING COUPONS/PROMOTIONS AT KIOSKS FOR RECYCLING MOBILE PHONES AND OTHER ELECTRONIC DEVICES," filed by the applicant on Dec. 11, 2014; U.S. patent application Ser. No. 14/568,051, titled "METHODS AND SYSTEMS FOR IDENTIFYING MOBILE PHONES AND OTHER ELECTRONIC DEVICES," filed by the applicant on Dec. 11, 2014; U.S. provisional application No. 62/091,426, titled "SYSTEMS AND METHODS FOR RECYCLING CONSUMER ELECTRONIC DEVICES," filed by the applicant on Dec. 12, 2014; U.S. patent application Ser. No. 14/598,469, titled "METHODS AND SYSTEMS FOR DYNAMIC PRICING AND PERFORMING OTHER PROCESSES ASSOCIATED WITH RECYCLING MOBILE PHONES AND OTHER ELECTRONIC DEVICES," filed by the applicant on Jan. 16, 2015; U.S. patent application Ser. No. 14/660,768, titled "SYSTEMS AND METHODS FOR INSPECTING MOBILE DEVICES AND OTHER CONSUMER ELECTRONIC DEVICES WITH A LASER," filed by the applicant on Mar. 17, 2015; U.S. patent application Ser. No. 14/663,331, titled "DEVICE RECYCLING SYSTEMS WITH FACIAL RECOGNITION," filed by the applicant on Mar. 19, 2015; U.S. provisional application No. 62/169,072, titled "METHODS AND SYSTEMS FOR VISUALLY EVALUATING ELECTRONIC DEVICES," filed by the applicant on Jun. 1, 2015; U.S. provisional application No. 62/202,330, titled "METHODS AND SYSTEMS FOR INSPECTING MOBILE DEVICES AND OTHER CONSUMER ELECTRONIC DEVICES WITH ROBOTIC ACTUATION," filed by the applicant on Aug. 7, 2015; U.S. provisional application No. 62/221,510, titled "METHODS AND SYSTEMS FOR RECORDING INTERACTIONS WITH A SYSTEM FOR PURCHASING MOBILE PHONES AND OTHER ELECTRONIC DEVICES," filed by the applicant on Sep. 21, 2015; U.S. patent application Ser. No. 14/873,158, titled "WIRELESS-ENABLED KIOSK FOR RECYCLING CONSUMER DEVICES," filed by the applicant on Oct. 1, 2015; U.S. patent application Ser. No. 14/873,145, titled "APPLICATION FOR DEVICE EVALUATION AND OTHER PROCESSES ASSOCIATED WITH DEVICE RECYCLING," filed by the applicant on Oct. 1, 2015; U.S. patent application Ser. No. 14/925,357, titled "SYSTEMS AND METHODS FOR RECYCLING CONSUMER ELECTRONIC DEVICES," filed by the applicant on Oct. 28, 2015; and U.S. patent application Ser. No. 14/925,375, titled "METHODS AND SYSTEMS FOR FACILITATING PROCESSES ASSOCIATED WITH INSURANCE SERVICES AND/OR OTHER SERVICES FOR ELECTRONIC DEVICES," filed by the applicant on Oct. 28, 2015, each of which is incorporated herein by reference in its entirety. All of the patents and patent applications listed above are commonly owned by the applicant of the present application, and they along with any other patents or patent applications identified herein are incorporated herein by reference in their entireties.

Certain details are set forth in the following description and in FIGS. 1-6 to provide a thorough understanding of various embodiments of the present technology. In other instances, well-known structures, materials, operations and/or systems often associated with smartphones and other handheld devices, consumer electronic devices, computer hardware, software, and network systems, etc. are not shown or described in detail in the following disclosure to avoid unnecessarily obscuring the description of the various embodiments of the present technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the present technology. Indeed, certain terms may even be emphasized below; however, any terminology intended to be interpreted in any restricted manner will be specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 illustrates an embodiment of an environment 100 in which various aspects of the present technology can be implemented. The environment 100 includes a first electronic device (e.g., an evaluator input device 110), a second electronic device (e.g., a target device 120), and a third electronic device (e.g., an evaluator hub device 130). In the illustrated embodiment, the evaluator input device 110 is depicted as a handheld electronic device such as a tablet computer, the target device 120 is depicted as a handheld electronic device such as a mobile phone, and the evaluator hub device 130 is depicted as a conventional computing device such as a personal computer or server. However, in other embodiments, the evaluator input device 110, the target device 120, and/or the evaluator hub device 130 can be any manner of electronic device in accordance with the functions thereof described herein. For example, the evaluator input device 110 could be, e.g., a notebook, desktop computer, or wearable device; the target device 120 could be, e.g., a tablet, a laptop, a handheld gaming device, a media player, etc.; and the evaluator hub device 130 could be, e.g., a mobile phone, tablet, laptop, or wearable device. Although many embodiments of the present technology are described herein in the context of mobile phones, aspects of the present technology are not limited to mobile phones and generally apply to other consumer electronic devices. Such devices include, as non-limiting examples, all manner of mobile phones; smartphones; handheld devices; personal digital assistants (PDAs); MP3 or other digital music players; tablet, notebook, ultrabook and laptop computers; e-readers; all types of cameras; GPS devices; set-top boxes and other media players; VoIP phones; universal remote controls; speakers; headphones; wearable computers; larger consumer electronic devices, such as desktop computers, TVs, projectors, DVRs, game consoles, Blu-Ray Disc™ players, printers, network attached storage devices, etc.; as well smaller electronic devices such as Google® Glass™, smartwatches (e.g., the Apple Watch™, Android Wear™ devices such as the Moto 360®, or the Pebble Steel™ watch), fitness bands, thumb drives, wireless hands-free devices; unmanned aerial vehicles; etc.

In the illustrated embodiment of FIG. 1, the target device 120 includes a communication interface (e.g., a connector port 122 and/or a wireless transceiver (not shown)), the evaluator input device 110 includes a communication interface (e.g., wireless transceiver (not shown)), and the evaluator hub device 130 similarly includes a communication interface (e.g., a connector port 118).

In this embodiment, the evaluator input device 110 can be electrically connected to the target device 120 and the evaluator hub device 130 via wireless connections 132 and 134, respectively, between the respective device transceivers, such as a Wi-Fi or Bluetooth network or an NFC link. In certain embodiments, the evaluator input device 110 can be electrically connected to the evaluator hub device 130 via a wired connection. The target device 120 can be electrically connected to the evaluator hub device 130 via a wired connection 140, such as a USB, Ethernet, or Lightning cable connected between the device connector ports 118 and 122. A display screen 115 of the evaluator input device 110 can display information, such as textual information, indicating that the evaluator input device 110 has identified the target device 120, an image representing the target device 120, and/or icons or buttons enabling the user to select various options or actions such as confirming the correct identification of the target device 120, pricing the target device 120, saving the target device 120 in a list of devices, etc. In some embodiments, the evaluator input device 110 and the evaluator hub device 130 can be the same machine, for example a laptop or tablet computer. Such a laptop or computer may be used by a local evaluator to provide input regarding the target device 120 and can also be electrically connected to the target device 120 (e.g., via wired connection 140) for electrical evaluation of the target device 120.

As described in detail below, the present technology enables a clerk, assistant, or a person at a retail store or other such premises to evaluate and recycle an individual's mobile phone or other such device.

For example, the evaluator input device 110 and the evaluator hub device 130 can be located in a retail store or other such location. A customer can bring the target device 120 into the retail store to recycle the target device 120. A clerk or other individual can utilize the evaluator input device 110 and the evaluator hub device 130 to obtain information about the target device 120 via the wireless connection 132 and/or the wired connection 140, and utilize the information to facilitate recycling and/or other processing of the target device 120. The term "processing" is used herein for ease of reference to generally refer to all manner of services and operations that may be performed on, with, or otherwise in relation to a target device. Such services and operations can include, for example, selling, reselling, recycling, donating, exchanging, identifying, evaluating, pricing, auctioning, decommissioning, transferring data from or to, reconfiguring, refurbishing, etc. mobile phones and other electronic devices. The term "recycling" is used herein for ease of reference to generally refer to selling and/or purchasing, reselling, exchanging, donating and/or receiving, etc. electronic devices. For example, owners may elect to sell their used electronic devices, and the electronic devices can be recycled for resale, reconditioning, repair, recovery of salvageable components, environmentally conscious disposal, etc.

Figure 2:
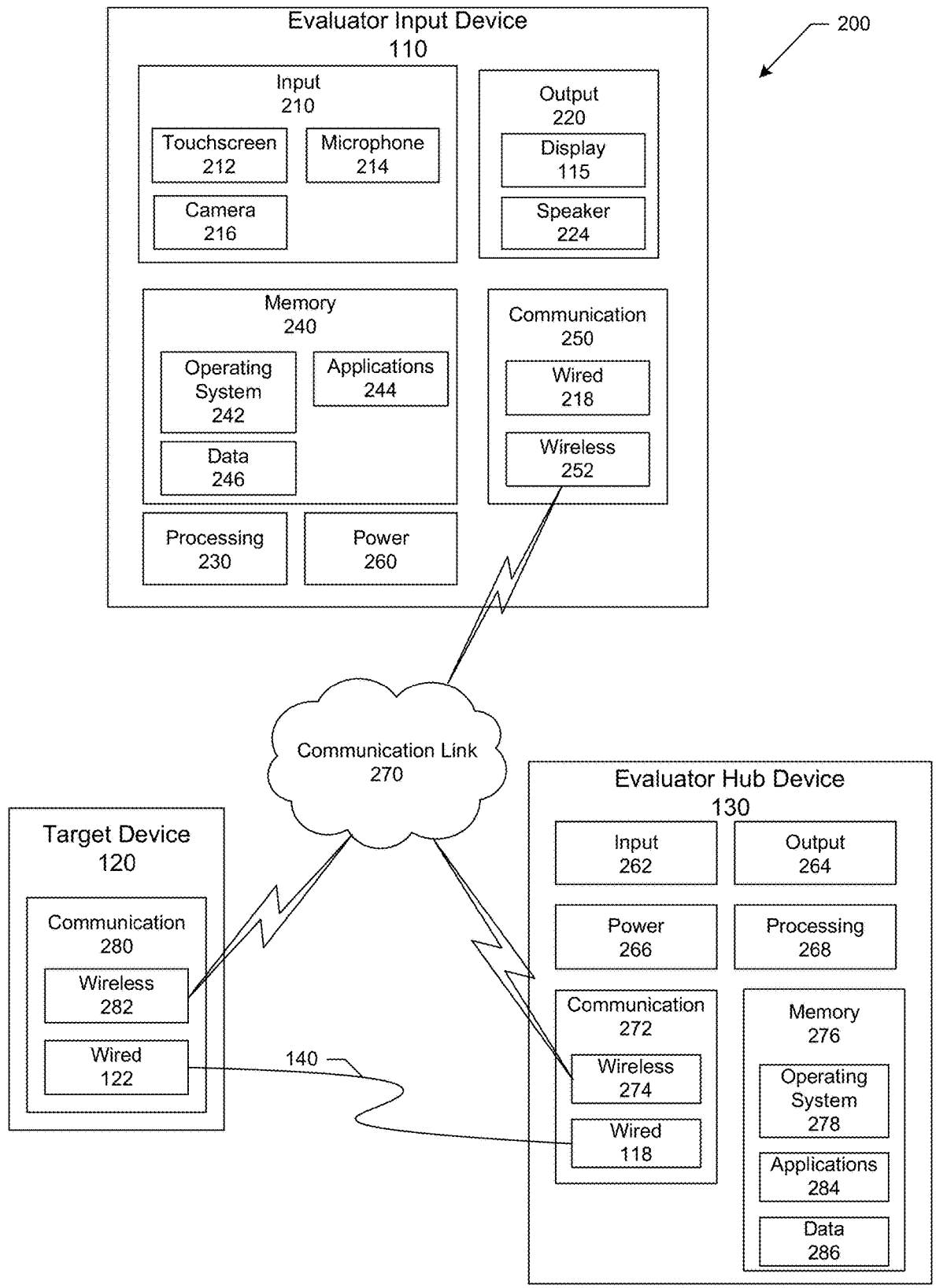
FIG. 2 is a block diagram illustrating various components typically incorporated in computing systems and other devices on which the present technology can be implemented.

FIG. 2 is a block diagram showing some of the components 200 typically incorporated in computing systems and other devices on which the present technology can be implemented. In the illustrated embodiment, the evaluator input device 110 includes a processing component 230 that controls operation of the evaluator input device 110 in accordance with computer-readable instructions stored in memory 240. The processing component 230 may include any logic processing unit, such as one or more central processing units (CPUs), graphics processing units (GPUs), digital signal processors (DSPs), application-specific integrated circuits (ASICs), etc. The processing component 230 may be a single processing unit or multiple processing units in an electronic device or distributed across multiple devices. Aspects of the present technology can be embodied in a special purpose computing device or data processor that is specifically programmed, configured, or constructed to perform one or more of the computer-executable instructions explained in detail herein. Aspects of the present technology can also be practiced in distributed computing environments in which functions or modules are performed by remote processing devices that are linked through a communications network, such as a local area network (LAN), wide area network (WAN), or the Internet. In a distributed computing environment, modules can be located in both local and remote memory storage devices.

The processing component 230 is connected to memory 240, which can include a combination of temporary and/or permanent storage, and both read-only memory (ROM) and writable memory (e.g., random access memory or RAM), writable non-volatile memory such as flash memory or other solid-state memory, hard drives, removable media, magnetically or optically readable discs, nanotechnology memory, biological memory, and so forth. As used herein, memory does not include a transitory propagating signal per se. The memory 240 includes data storage that contains programs, software, and information, such as an operating system 242, application programs 244, and data 246. Evaluator input device 110 operating systems can include, for example, Windows®, Linux®, Android™, iOS®, and/or an embedded real-time operating system. The application programs 244 and data 246 can include software and databases configured to control evaluator input device 110 components, process target device 120 information and data (to, e.g., evaluate device make, model, condition, pricing, etc.), communicate and exchange data and information with remote computers and other devices, etc.

The evaluator input device 110 can further include input components 210 that receive input from user interactions and provide input to the processor 230, typically mediated by a hardware controller that interprets the raw signals received from the input device and communicates the information to the processor 230 using a known communication protocol. Examples of an input component 210 include a keyboard (with physical or virtual keys), a pointing device (such as a mouse, dial, or eye tracking device), a touchscreen 212 that detects contact events when it is touched by a user, a microphone 214 that receives audio input, and a camera 216 for still photograph and/or video capture. The evaluator input device 110 can also include various other input components 210 such as GPS or other location determination sensors, motion sensors, wearable input devices with accelerometers (e.g. wearable glove-type input devices), biometric sensors (e.g., fingerprint sensors), light sensors, card readers (e.g., magnetic stripe readers or memory card readers) or the like.

The processor 230 can also be connected to one or more various output components 220, e.g., directly or via a hardware controller. The output devices can include a display 115 on which text and graphics are displayed. The display 115 can be, for example, an LCD, LED, or OLED display screen (such as a desktop computer screen, handheld device screen, or television screen), an e-ink display, a projected display (such as a heads-up display device), and/or a display integrated with a touchscreen 212 that serves as an input device as well as an output device that provides graphical and textual visual feedback to the user. The output devices can also include a speaker 224 for playing audio signals, haptic feedback devices for tactile output such as vibration, etc. In some implementations, the speaker 224 and the microphone 214 are implemented by a combined audio input-output device.

In the illustrated embodiment, the evaluator input device 110 further includes one or more communication components 250. The communication components can include, for example, a wireless transceiver 252 (e.g., one or more of a Wi-Fi transceiver; Bluetooth transceiver; near-field communication (NFC) device; wireless modem or cellular radio utilizing GSM, CDMA, 3G and/or 4G technologies; etc.) and/or a wired network connection 218 (e.g., one or more of an Ethernet port, cable modem, FireWire cable, Lightning connector, universal serial bus (USB) port, etc.). The communication components 250 are suitable for communication between the evaluator input device 110 and other local and/or remote computing devices, e.g., the target device 120 and/or the evaluator hub device 130, directly via a wired or wireless peer-to-peer connection and/or indirectly via the communication link 270 (which can include the Internet, a public or private intranet, a local or extended Wi-Fi network, cell towers, the plain old telephone system (POTS), etc.). For example, the wireless transceiver 252 of the evaluator input device 110 can connect to the wireless transceiver 282 of the target device 120 and/or the wireless transceiver 274 of the evaluator hub device 130 via the wireless connection. The evaluator input device 110 further includes power 260, which can include battery power and/or facility power for operation of the various electrical components associated with the evaluator input device 110.

The evaluator hub device 130 can include several components similar to those in the evaluator input device 110. In the illustrated embodiment, the evaluator hub device 130 includes a processing component 268 that controls operation of the evaluator hub device 130 in accordance with computer-readable instructions stored in memory 276. The processing component 268 may be any logic processing unit, such as one or more central processing units (CPUs), graphics processing units (GPUs), digital signal processors (DSPs), application-specific integrated circuits (ASICs), etc. The processing component 268 may be a single processing unit or multiple processing units in an electronic device or distributed across multiple devices. The processing component 268 is connected to memory 276, which includes data storage that contains programs, software, and information, such as an operating system 278, application programs 284, and data 286. The operating system 278 can include, for example, Windows®, Linux®, Android™, iOS®, and/or an embedded real-time operating system. The application programs 284 and data 286 can include software and databases configured to control evaluator hub device 130 components, process target device 120 and/or evaluator input device 110 information and data (to, e.g., evaluate device make, model, condition, pricing, etc.), communicate and exchange data and information with remote computers and other devices, etc.

The evaluator hub device 130 can include input components 262, such as a keyboard (with physical or virtual keys), a pointing device (such as a mouse, joystick, dial, or eye tracking device), a touchscreen, a microphone, and a camera for still photograph and/or video capture. The evaluator hub device 130 can also include various other input components 262 such as GPS or other location determination sensors, motion sensors, wearable input devices with accelerometers (e.g. wearable glove-type input devices), biometric sensors (e.g., fingerprint sensors), light sensors, card readers (e.g., magnetic stripe readers or memory card readers) and the like.

The processor 268 can also be connected to one or more various output components 264, e.g., directly or via a hardware controller. The output devices can include a display such as an LCD, LED, or OLED display screen (such as a desktop computer screen, handheld device screen, or television screen), an e-ink display, a projected display (such as a heads-up display device), and/or a display integrated with a touchscreen that serves as an input device as well as an output device that provides graphical and textual visual feedback to the user. The output devices can also include a speaker for playing audio signals, haptic feedback devices for tactile output such as vibration, etc.

In the illustrated embodiment, evaluator hub device 130 further includes one or more communication components 272. The communication components can include, for example, a wireless transceiver 274 (e.g., one or more of a Wi-Fi transceiver; Bluetooth transceiver; near-field communication (NFC) device; wireless modem or cellular radio utilizing GSM, CDMA, 3G and/or 4G technologies; etc.) and/or a wired network connector port 118 (e.g., one or more of an Ethernet port, cable modem, FireWire cable, Lightning connector, universal serial bus (USB) port, etc.). The communication components 272 are suitable for communication between the evaluator hub device 130 and other local and/or remote computing devices, e.g., the evaluator input device 110 and/or the target device 120, directly via a wired or wireless peer-to-peer connection and/or indirectly via the communication link 270. For example, the wireless transceiver 274 of the evaluator hub device 130 can connect to the wireless transceiver 282 of the target device 120 and/or the wireless transceiver 252 of the evaluator input device 110 via the wireless connection, and/or the wired connector port 118 of the evaluator hub device 130 can connect to the wired connector port 122 of the target device 120 via the wired connection 140. The evaluator hub device 110 further includes power 266, which can include battery power and/or facility power for operation of the various electrical components associated with the evaluator hub device 130.

The target device 120 can include, among other components, one or more communication components 280. The communication components 280 can include, for example, a wireless transceiver 282 (e.g., one or more of a Wi-Fi transceiver; Bluetooth transceiver; near-field communication (NFC) device; wireless modem or cellular radio utilizing GSM, CDMA, 3G and/or 4G technologies; etc.) and/or a wired network connector port 122 (e.g., one or more of an Ethernet port, cable modem, FireWire cable, Lightning connector, universal serial bus (USB) port, etc.). The communication components 280 are suitable for communication between the target device 120 and other local and/or remote computing devices (e.g., evaluator input device 110, the evaluator hub device 130) directly via a wired or wireless peer-to-peer connection and/or indirectly via the communication link 270 (which can include the Internet, a public or private intranet, a local or extended Wi-Fi network, cell towers, the plain old telephone system (POTS), etc.). For example, the wireless transceiver 282 of the target device 120 can connect to the wireless transceiver 282 of the target device 120 and/or the wireless transceiver 252 of the evaluator input device 110 via the communication link 270, and/or the wired connector port 122 of the target device 120 can connect to the wired connector port 118 of the evaluator hub device 130 via the wired connection 140.

Unless described otherwise, the construction and operation of the various components shown in FIG. 2 are of conventional design. As a result, such components need not be described in further detail herein, as they will be readily understood by those skilled in the relevant art. In other embodiments, the evaluator input device 110 and/or the target device 120 can include other features that may be different from those described above. In still further embodiments, the evaluator input device 110 and/or the target device 120 can include more or fewer features similar to those described above.

Figure 3:
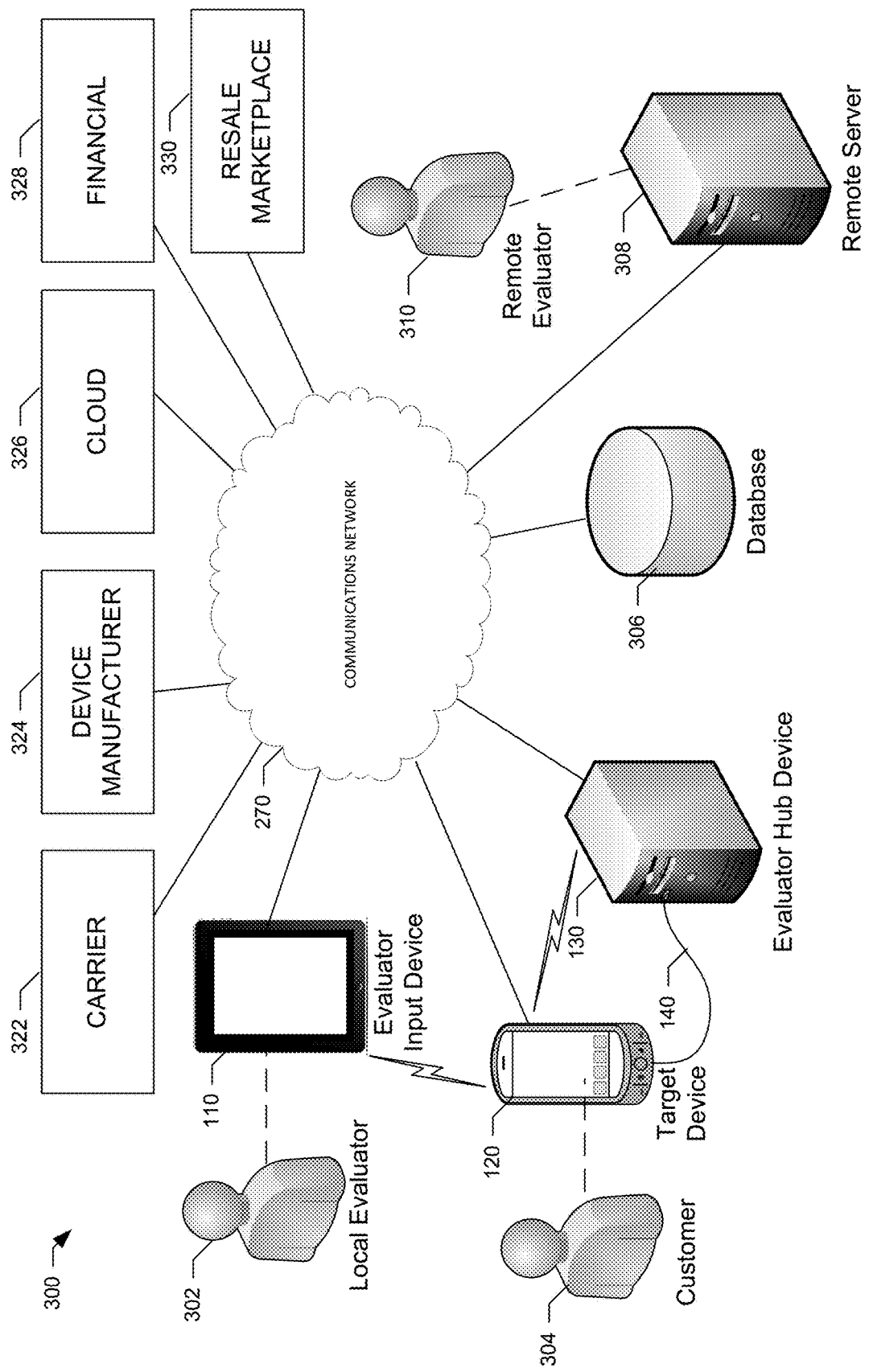
FIG. 3 is a schematic diagram of a suitable distributed computing environment for implementing various aspects of the present technology.

FIG. 3 is a schematic diagram of a suitable network environment 300 for implementing various aspects of a target device evaluating and recycling system configured in accordance with embodiments of the present technology. In the illustrated embodiment, various computing devices including the evaluator input device 110 and the evaluator hub device 130 can exchange information with one or more remote computers (e.g., one or more server computers 308) via the communication link 270. Although the communication link 270 can include a publicly available network (e.g., the Internet with a web interface), a private communication link, such as an intranet or other network can also be used. Moreover, in various embodiments the individual evaluator input device 110 and/or the evaluator hub device 130 can be connected to a host computer (not shown) that facilitates the exchange of information between the evaluator input device 110, the evaluator hub device 130, remote computers, mobile devices, etc.

The remote server 308 can perform many or all of the functions for receiving, routing and storing of electronic messages, such as data lookup queries, webpages, audio signals and electronic images and/or video necessary to implement the various electronic transactions described herein. For example, the remote server 308 can retrieve and exchange web pages and other content with an associated database or databases, for example in some embodiments the remote server 308 can communicate with the database 306, which can store information relating to customers of a particular retail store or group of retail stores, including past purchases, model of purchased devices, insurance plans, carrier service plans, etc. In some embodiments, the database can include information related to target devices 120 such as mobile phones and/or other consumer electronic devices. Such information can include, for example, make, model, serial number, International Mobile Equipment Identity (IMEI) number, carrier plan information, pricing information, owner information, etc. In various embodiments the remote servers 308 can also include a server engine, a web page management component, a content management component, and/or a database management component. The server engine can perform the basic processing and operating system level tasks associated with the various technologies described herein. The webpage management component can handle creation and/or display and/or routing of web or other display pages. The content management component can handle many of the functions associated with the routines described herein. The database management component can perform various storage, retrieval and query tasks associated with the database, and can store various information and data such as animation, graphics, visual and audio signals, etc.

In the illustrated embodiment, the evaluator input device 110 and the evaluator hub device 130 can also be operably connected to each other and/or to a plurality of other remote devices and systems via the communication link 270. For example, the evaluator input device 110 can include wired and/or wireless communication facilities for exchanging digital information with the target devices 120 for recycling. The evaluator input device 110, the evaluator hub device 130, and/or the remote server 308 can also be operably connectable to a series of remote computers for obtaining data and/or exchanging information with necessary service providers, financial institutions, device manufactures, authorities, government agencies, etc. For example, the evaluator input device 110, the evaluator hub device 130, and/or the remote server 308 can be operably connected to one or more cell carriers 322, one or more device manufacturers 324 (e.g., mobile phone manufacturers), one or more electronic payment or financial institutions 328, one or more databases (e.g., the Group Speciale Mobile Association (GSMA) International Mobile Equipment Identity (IMEI) Database, etc.), and one or more computers and/or other remotely located or shared resources associated with cloud computing 326. The financial institutions 328 can include all manner of entity associated with conducting financial transactions, including banks, credit/debit card facilities, online commerce facilities, online payment systems, virtual cash systems, money transfer systems, etc.

In addition to the foregoing, the evaluator input device 110, the evaluator hub device 130, and/or the remote server 308 can also be operably connected to a resale marketplace 330. The resale marketplace 330 represents a system of remote computers and/or services providers associated with the reselling of consumer electronic devices through both electronic and brick and mortar channels. Such entities and facilities can be associated with, for example, online auctions for reselling used electronic devices as well as for establishing market prices for such devices.

Individuals interacting in the networked environment 300 include a local evaluator 302 who utilizes the evaluator input device 110. The local evaluator 302 can be, for example, an employee associated with a retail store (e.g., a carrier store, an electronics store, a department store, etc.) or other such establishment. A customer 304 is the owner of the target device 120 which is a candidate for recycling. As described in more detail below, the customer 304 can take the target device 120 to the store for evaluation and possible recycling, for example with the assistance of the local evaluator 302 using the evaluator input device 110. Additionally, in some embodiments a remote evaluator 310 can interact with the remote server 308, for example, to verify images and/or video of the target device 120 or to otherwise assist the local evaluator 302 in evaluating the target device 120 of the customer 304.

The foregoing description of the networked environment 300 illustrates but one possible network system suitable for implementing the various technologies described herein. Accordingly, those of ordinary skill in the art with appreciate that other systems consistent with the present technology can omit one or more of the facilities described in reference to FIG. 3, or can include one or more additional facilities not described in detail in FIG. 3.

The evaluator input device 110, target devices 120, remote server 308, user computers or devices, etc. can include one or more central processing units or other logic-processing circuitry, memory, input devices (e.g., keyboards and pointing devices), output devices (e.g., display devices and printers), and storage devices (e.g., magnetic, solid state, fixed and floppy disk drives, optical disk drives, etc.). Such computers can include other program modules such as an operating system, one or more application programs (e.g., word processing or spreadsheet applications), and the like. The computers can include wireless computers, such as mobile phones, personal digital assistants (PDAs), palm-top computers, tablet computers, notebook and laptop computers desktop computers, e-readers, music players, GPS devices, wearable computers such as smartwatches and Google® Glass™, etc., that communicate with the Internet via a wireless link. The computers may be general-purpose devices that can be programmed to run various types of applications, or they may be single-purpose devices optimized or limited to a particular function or class of functions. Aspects of the invention may be practiced in a variety of other computing environments.

While the Internet is shown, a private network, such as an intranet can likewise be used herein. The network can have a client-server architecture, in which a computer is dedicated to serving other client computers, or it can have other architectures such as peer-to-peer, in which one or more computers serve simultaneously as servers and clients. A database or databases, coupled to the server computer(s), stores much of the web pages and content exchanged between the user computers. The server computer(s), including the database(s), can employ security measures to inhibit malicious attacks on the system, and to preserve integrity of the messages and data stored therein (e.g., firewall systems, message encryption and/or authentication (e.g., using transport layer security (TLS) or secure sockets layer (SSL)), password protection schemes, encryption of stored data (e.g., using trusted computing hardware), and the like).

One skilled in the relevant art will appreciate that the concepts of the invention can be used in various environments other than location based or the Internet. In general, a display description can be in HTML, XML, or WAP format, email format or any other format suitable for displaying information (including character/code-based formats, algorithm-based formats (e.g., vector generated), and bitmapped formats). Also, various communication channels, such as local area networks, wide area networks, or point-to-point dial-up connections, can be used instead of the Internet. The system can be conducted within a single computer environment, rather than a client/server environment. Also, the user computers can comprise any combination of hardware or software that interacts with the server computer, such as television-based systems and various other consumer products through which commercial or noncommercial transactions can be conducted. The various aspects of the invention described herein can be implemented in or for any e-mail environment.

Although not required, aspects of the invention are described in the general context of computer-executable instructions, such as routines executed by a data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a LAN, a WAN, or the Internet. In a distributed computing environment, program modules can be located in both local and remote memory storage devices.

Those of ordinary skill in the art will appreciate that the routines and other functions and methods described herein can be implemented as an application specific integrated circuit (ASIC), by a digital signal processing (DSP) integrated circuit, through conventional programmed logic arrays and/or circuit elements. While many of the embodiments are shown and described as being implemented in hardware (e.g., one or more integrated circuits designed specifically for a task), such embodiments could equally be implemented in software and be performed by one or more processors. Such software can be stored on any suitable computer-readable medium, such as microcode stored in a semiconductor chip, on a computer-readable disk, or downloaded from a server and stored locally at a client.

Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media. The data storage devices can include any type of computer-readable media that can store data accessible by a computer, such as magnetic hard and floppy disk drives, optical disk drives, magnetic cassettes, tape drives, flash memory cards, DVDs, Bernoulli cartridges, RAM, ROMs, smart cards, etc. Indeed, any medium for storing or transmitting computer-readable instructions and data may be employed, including a connection port to a network such as a LAN, WAN, or the Internet. Alternatively, computer implemented instructions, data structures, screen displays, and other data under aspects of the invention can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). The terms "memory" and "computer-readable storage medium" include any combination of temporary, persistent, and/or permanent storage, e.g., ROM, writable memory such as RAM, writable non-volatile memory such as flash memory, hard drives, solid state drives, removable media, and so forth, but do not include a transitory propagating signal per se.

Figure 4:
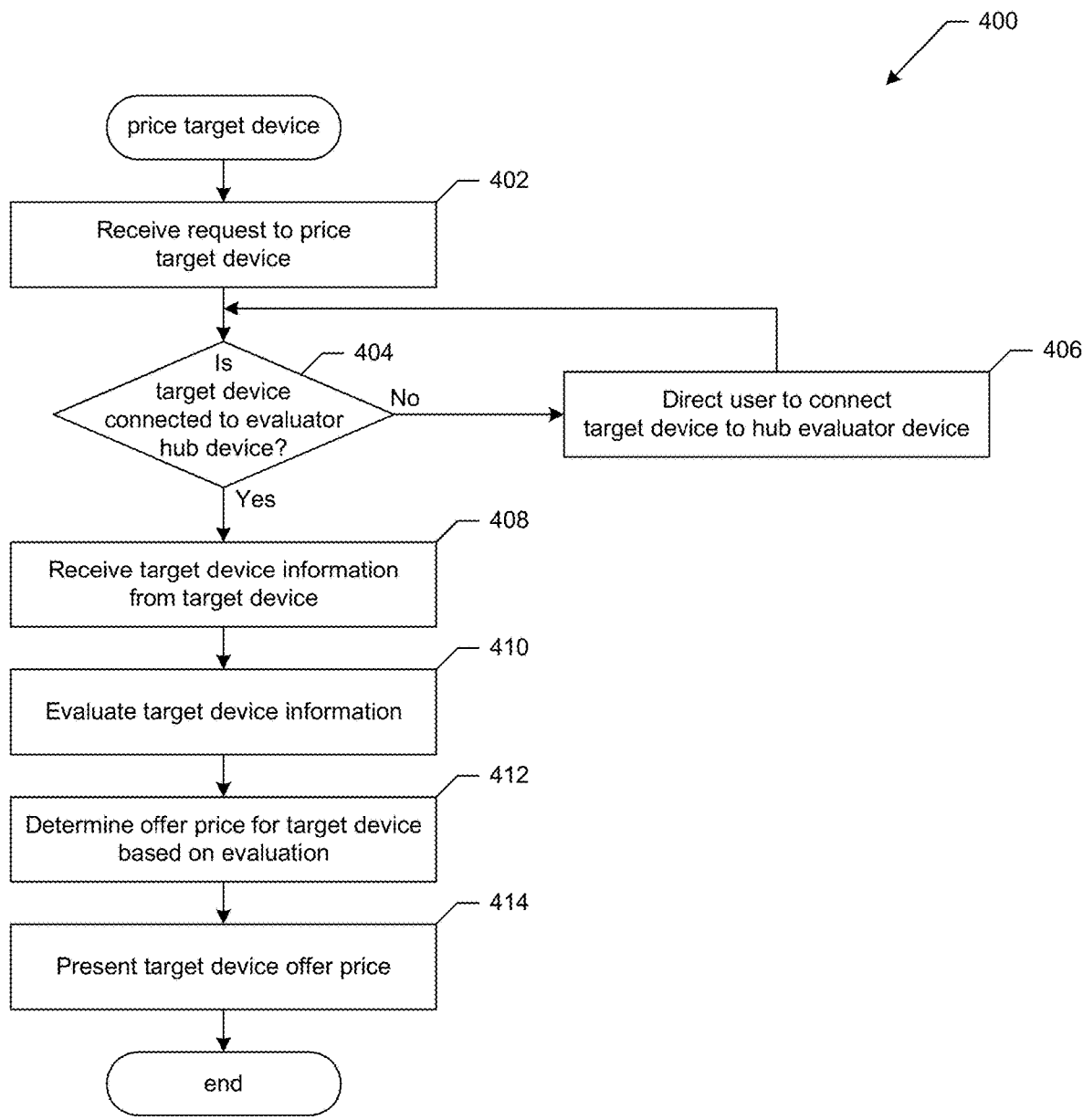
FIG. 4 is a flow diagram of a routine for pricing a target device for recycling in accordance with embodiments of the present technology.

FIG. 4 is a high-level flow diagram of a routine 400 for pricing a target device (e.g., the target device) 120 of FIG. 1, such as a mobile phone, tablet computer, mp3 player, TV, SLR, etc.) for recycling in accordance with embodiments of the present technology. In various embodiments, an application running on an evaluator device (e.g., the evaluator input device 110 of FIG. 1 such as a tablet), and/or another processing device operatively connectable to the evaluator device, such as a remote computer (e.g., the evaluator hub device 130 of FIG. 1), can perform some or all of the routine 400. In some instances, for example, a user who owns the target device 120 (e.g., a mobile phone, etc.) may want to know how much the target device 120 is worth so that he or she can decide whether to sell it. The routine 400 of FIG. 4 enables a clerk at a retail store or other such individual to utilize the evaluator input device 110 to quickly obtain a current price for the target device 120.

In various embodiments, the routine 400 and the other flow routines described in detail herein can be implemented by one or more applications ("apps") running on the evaluator input device 110, the evaluator hub device 130, and/or one or more remote servers 308. For example, the evaluator input device 110 can run an app that can obtain information about a connected target device 120. The target device 120 may be, for example, one of various consumer electronic devices, such as a used mobile telecommunication device, which includes all manner of handheld devices having wired and/or wireless communication capabilities (e.g., a smartphone, computer, TV, game console, home automation device, etc.). In some embodiments, the local evaluator 302 (FIG. 3) downloads the app to the evaluator input device 110 from an app store or other software repository associated with the device manufacturer 324 or a third party (e.g., the Apple® App Store℠, Google Play™ store, Amazon® Appstore™, a third party device recycler or reseller, etc.), from a website, from a removable memory device such as an SD flash card or USB drive, etc. In other embodiments, the app is loaded on the evaluator input device 110 before it is first acquired by the local evaluator 302 (e.g., preinstalled by the device manufacturer 324, a wireless service carrier 322, a device recycler, a device vendor, etc.).

In block 402, the routine 400 begins by receiving a request to price a target device 120. The request can be, for example, provided by the local evaluator 302, and the target device 120 can be provided by the customer 304 interested in selling the target device 120. For example, the local evaluator 302 can activate the app on the evaluator input device 110 (e.g., by selecting an icon representing the app on a touch screen of the evaluator input device 110) and choose a function to begin a process to price the target device 120. In some embodiments, the app enables the local evaluator 302 to select a particular make and/or model corresponding to the target device 120 from a list of electronic devices corresponding to devices connected to the evaluator input device 110, and/or from a list of electronic devices previously saved in the memory 240 for evaluation and pricing.

In some instances, the target device 120 is electrically connected to the evaluator input device 110 (e.g., via a data cable or the wireless data connection 132), while in other instances, the target device 120 may be disconnected from the evaluator input device 110 when the local evaluator 302 wants to find out how much the target device 120 is worth. In decision block 404, the routine 400 determines whether the target device 120 is communicatively connected to the evaluator hub device 130. For example, the evaluator input device 110 and the evaluator hub device 130 can be connected over a wired or wireless network connection, allowing the two devices to communicate with one another during the evaluation process. The evaluator hub device 130 can include the electrical connector 140 configured to connect to the target device 120 at one end (using, for example, a Lightning connector) and at the evaluator hub device 130 at the other end (via, for example, a USB connector). In some embodiments, the evaluator input device 110 and the evaluator hub device 130 can be the same machine, for example a laptop or tablet computer. Such a laptop or computer may be used by the local evaluator 302 to provide input regarding the target device 120 and can also be electrically connected to the target device 120 (e.g., via wired connection 140) for electrical evaluation of the target device 120.

If the target device 120 is not connected to the evaluator hub device 130, then in block 406 the routine 400 directs the user to connect the target device 120 to the evaluator hub device 130 via the wired connection 140. For example, the app can display instructions on the screen 115 of the evaluator input device 110 directing the local evaluator 302 or the customer 304 to connect the device 120 to the evaluator hub device 130 by plugging the cable 140 into both devices, by pairing the devices to each other over a short-range communication link such as Bluetooth or NFC, or by joining both devices to a common network such as an Ethernet or Wi-Fi LAN. In some embodiments, the routine 400 can associate the target device 120 with one or more connection types, so that the instructions to connect the target device 120 to the evaluator input device 110 are specific to an associated connection type. In some embodiments, the app is configured to automatically detect when the target device 120 is connected to the evaluator hub device 130. The routine 400 can thus automatically detect newly connected target devices 120 and provide an indication of the new devices to the user. In some embodiments, the app receives user input (e.g., by selection of an option on the touchscreen 212) indicating that the target device 120 is available via a wired connection 140 or a wireless connection, and the app can respond by attempting to connect to the indicated target device 120. After block 406, the routine 400 returns to decision block 404.

Once the target device 120 is connected to the evaluator hub device 130, the routine 400 proceeds to block 408. In block 408, the routine 400 receives or otherwise obtains information about the target device 120 from the target device 120 via the app. In some embodiments, the routine 400 obtains the information automatically, i.e., without receiving manual user input associated with the information. For example, a USB host (e.g., the evaluator hub device 130) can prompt a USB peripheral (e.g., the target device 120) to transmit its vendor ID number (a code identifying the manufacturer of the USB peripheral) and its device ID number (a code identifying the model of the USB peripheral). In some embodiments, the evaluator hub device 130 is connected to the target device 120 via the USB cable into and the evaluator hub device 130 receives vendor ID and device ID codes from the target device 120 over the USB cable connection. In other embodiments, the evaluator hub device 130 is connected to the target device by one or more of various other types of wired or wireless data connections, and can obtain different information. The information obtained from the evaluator hub device 130 can then be transmitted to the evaluator input device 110, for example for display via the screen 115 of the evaluator input device 110. The routine 400 can store the information about the target device 120 in a data structure on the evaluator input device 110 (e.g., in a table maintained by the app), on the evaluator hub device 130, and/or remotely from the evaluator input device 110 or the evaluator hub device 130 (e.g., in a data structure maintained at one or more of the server computer 308, the cloud storage facility 326, etc.).

In block 410, the routine 400 evaluates the target device information. In some embodiments, the routine 400 performs the evaluation automatically, i.e., without receiving user input manually evaluating the target device 120. As part of evaluating the target device 120, the evaluator hub device 130 can identify the target device 120 and/or assess its condition, as described in more detail below with respect to FIG. 5. For example, the evaluator hub device 130 can identify the target device 120 by determining one or more of the target device platform, make, model, carrier (for a mobile phone, for example), features, configuration (e.g., memory and/or other storage capacity), upgrades, peripherals, etc. based on the target device information. For example, if the information includes a device part number MD761LL/B, the evaluation can determine that the target device 120 is an Apple® MacBook Air® laptop computer with a 13.3" screen and 256 GB of flash storage from early 2014. In various embodiments, the app or a remote server can query a local or remote database (e.g., the database 306 in FIG. 3) using the target device information. For example, after the app receives USB vendor ID and device ID codes, the routine 400 can search a local and/or remote data structure that maps those codes to information about the USB device. As another example, the app or the remote server can obtain information including a mobile phone IMEI number and can then communicate remotely (via, e.g., a wireless or wired link) with a backend database such as the GSMA IMEI Database, parsing the IMEI to determine or verify the make and/or model of the mobile phone.

In block 412, the routine 400 determines an offer price for the target device 120 based on the evaluation performed in block 410. For example, the routine 400 can consult a local or remote database (for example, the database 306) to price the target device 120 based on the information and the evaluation of the target device 120. For example, when the evaluation has determined the make, model, and configuration of the target device 120, the routine 400 can search a data structure that maps the make, model, and/or configuration of the device to a price for the device. For example, if the evaluation has determined that the target device 120 is an Apple® MacBook Air® laptop computer with a 13.3" screen and 256 GB of flash storage from early 2014, the routine 400 can query a pricing data structure or service to obtain a current price for the target device 120 based on that determination. In some embodiments, the app can transmit some or all of the information received in block 408 and/or the results of the evaluation performed in block 410 to a remote server. The remote server can then use the information and/or evaluation results to determine the current market value of the target device 120 (such as by looking up the value of the target device 120 in a database) and return a price that the app can offer the user for the target device 120. In other embodiments, the app on the evaluator input device 110 downloads pricing data from a remote server (e.g., the server computer 308 of FIG. 3), and the app determines an offer price for the target device 120 based on the pricing data downloaded from the server. For example, in some embodiments, the app can download a database of prices, such as a lookup table, pricing model, or other data structure containing prices for popular electronic devices. The app can use the information about the make and model of the target device 120 to look up the current value of the subject target device 120 in the table. In various embodiments, the pricing data is updated periodically, such as daily. The routine 400 can ensure that such pricing data is kept current, so that the app offers only current, accurate prices.

In block 414, the routine 400 presents the price for the target device 120 to the user. For example, the app can display the offer price on the display screen 115 of the evaluator input device 110, and/or a remote server can send the device owner (e.g., the customer 304), a text message or email containing the price that the user can obtain by selling the target device 120 within a certain time. For example, the routine 400 can indicate that the offer price will be valid for a certain period of time. In some embodiments, the app can reward the user with incentives for submitting the target device 120 for recycling. Such incentives can include, for example, a time-expiring offer, a coupon valid at the store in which the evaluator input device 110 and evaluator hub device 130 are located, a bonus for recycling additional devices, a referral bonus, etc. In some embodiments, the routine 400 can provide a higher offer price to the customer 304 if the customer uses the dispensed value toward the purchase of a new device or other product at the retail store. After block 414, the routine 400 ends.

FIG. 4 and the flow diagrams that follow are representative and may not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented. Those skilled in the art will appreciate that the blocks shown in FIG. 4 and in each of the flow diagrams discussed below may be altered in a variety of ways. For example, while processes or blocks are presented in a given order, alternative implementations may perform routines in a different order, and some processes or blocks may be rearranged, deleted, moved, added, subdivided, combined, and/or modified to provide alternative or sub-combinations. Each of these processes or blocks may be implemented in a variety of different ways. Also, although processes or blocks are at times shown as being performed in series, these processes or blocks may instead be performed or implemented in parallel, or may be performed at different times. Some of the blocks depicted in FIG. 4 and the other flow diagrams are of a type well known in the art, and can themselves include a sequence of operations that need not be described herein. Those of ordinary skill in the art can create source code and/or microcode, program logic arrays, or otherwise implement the invention based on the flow diagrams and the detailed description provided herein.

In various embodiments, all or a portion of the routine 400 and the routines in the other flow diagrams herein can be implemented by means of a consumer or other user (such as a retail employee) operating one or more of the electronic devices and systems described above. For example, in some embodiments, the routine 400 and other routines disclosed herein can be implemented by a mobile device, such as the evaluator input device 110 described above with reference to FIG. 1 or stationary devices such as the evaluator hub device 130. In some instances, the routines can be implemented by one or more apps that can run on one or more evaluator input devices 110, evaluator hub devices 130, and/or on one or more target devices 120. In some embodiments, portions (e.g., blocks) of the routine can be performed by one or more remote computers. For example, such remote computers can include one or more of the remote server 308 of FIG. 3 and/or computing resources associated with the cloud 326 or the resale marketplace 330, separately or in combination. The remote computers can perform the routines described herein using one or more local and/or remote databases (e.g., the database 306 of FIG. 3, or such as the GSMA IMEI Database). Accordingly, the description of the routine 400 and the other routines disclosed herein may refer interchangeably to the routine, the app, the evaluator input device 110, the evaluator hub device 130, and/or the target device 120 performing an operation, with the understanding that any of the above devices, systems, and resources can perform all or part of the operation.

While various embodiments of the present technology are described herein using mobile phones and other handheld devices as examples of electronic devices, the present technology applies generally to all types of electronic devices. For example, in some embodiments, the app can be installed and/or run on a larger evaluator input device 110, the evaluation hub device 130, and/or the target device 120, e.g., a laptop or tower computer, to perform all or a portion of the routine 400.

Figure 5:
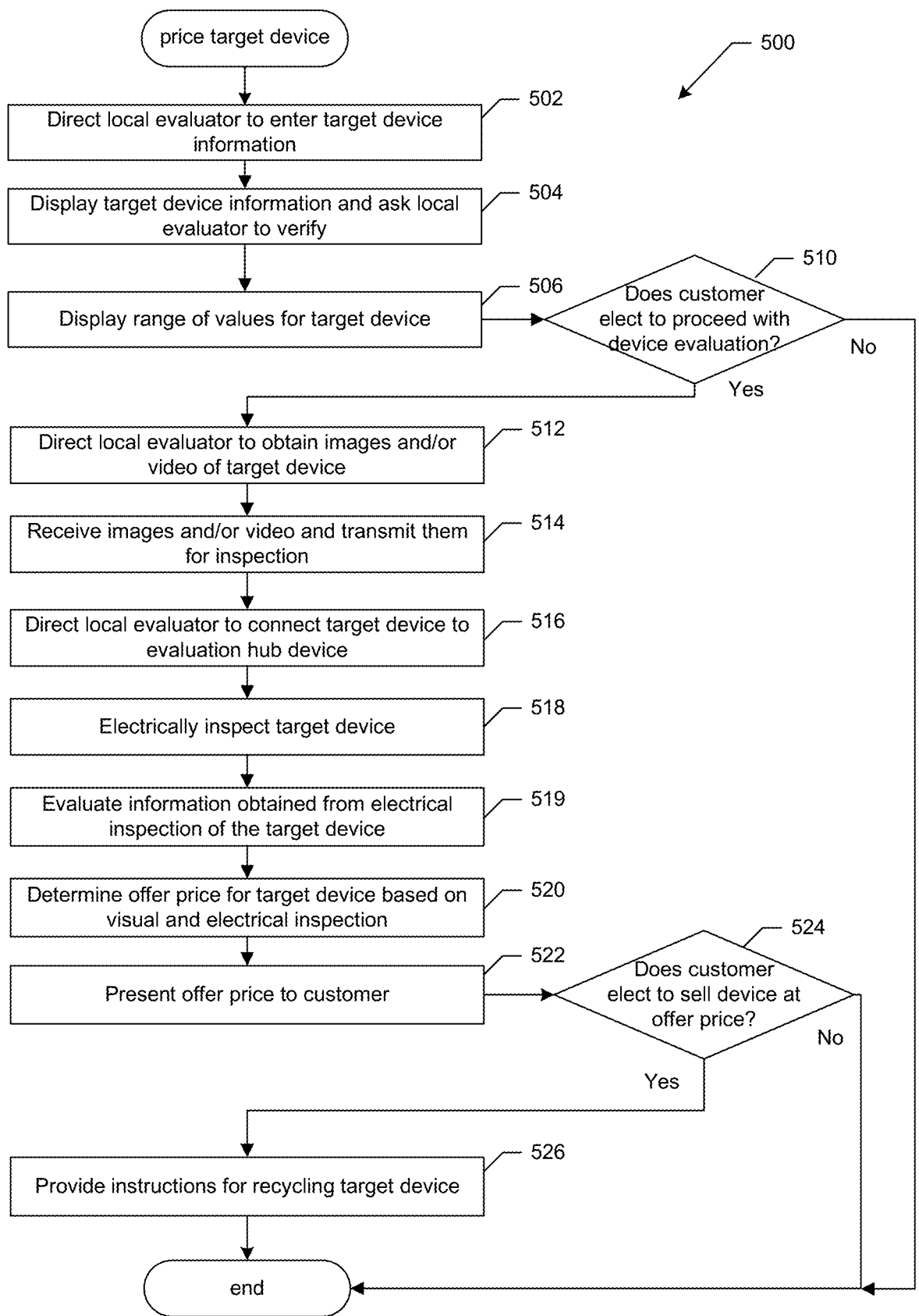
FIG. 5 is a flow diagram of another routine for pricing a target device for recycling in accordance with embodiments of the present technology.

FIG. 5 is a flow diagram of a routine 500 for pricing a target device 120 (e.g., a mobile phone, laptop computer, VoIP phone, smartwatch, etc.) for recycling in accordance with embodiments of the present technology. The routine 500 of FIG. 5 depicts a process similar to the routine 400 of FIG. 4, but may have additional and/or alternative steps. In various embodiments, one or more apps can run on an evaluator device (e.g., the evaluator input device 110 of FIG. 1) and/or another processing device operatively connectable to the app, such as a evaluator hub device 130 or a remote server, can perform some or all of the routine 500. In some instances, a customer 304 (FIG. 3) who owns a target device 120 may bring the target device 120 to a retail store to determine how much the target device 120 is worth so that he or she can make an informed decision about whether to sell it. The routine 500 of FIG. 5 enables the local evaluator 302, such as a clerk or other individual at the retail store (or other location housing the evaluator input device 110), to use the evaluator input device 110 to conveniently price the target device 120 of the customer 304.

In block 502, the routine directs the local evaluator 302 (e.g., a retail clerk) to enter target device information. For example, the local evaluator 302 can inspect the target device 120 that the customer 304 has brought into the store and enter relevant information (e.g., via the touchscreen 212 or other interface of the evaluator input device 110; FIG. 2) such as the make, model, IMEI number, etc. In some embodiments, a customer may wish to recycle a peripheral or other electronic device (e.g., such as USB devices, speakers, printers, hard disk drives, mobile phones, computers, etc.) and in some embodiments, the devices are plugged into the evaluator input device 110. The app running on the evaluator input device 110 can query an operating system 242 Application Programming Interface (API) of the evaluator input device 110 to obtain information about peripherals or other electronic devices operably connected to the evaluator input device 110, For example, in an evaluator input device 110 running an Android™ operating system 242, the app can discover USB devices by either using an intent filter to be notified of each system event when a USB device is attached, or by enumerating USB devices that are already connected using a UsbManager class getDeviceList( ) method. As another example, the app can monitor traffic on networks to which the evaluator input device 110 is connected (e.g., Ethernet and/or Wi-Fi), and detect other devices that send communications over those networks.

Information entered by the local evaluator 302 into the evaluator input device 110 can be transmitted to remote servers (e.g., remote server 308) and databases (e.g., database 306) for storage and analysis. This information could go directly to the server or be proxied through a computer or server (e.g., the evaluator hub device 130) that is on the same network that the evaluator input device 110 is connected to via WiFi.

In block 504, the routine displays the target device 120 information and asks the local evaluator 302 to verify it. In cases in which the local evaluator 302 has manually entered the information, this serves as a confirmation step to review entered information. In cases in which the information has been automatically obtained, for example via a WiFi connection to the target device, the local evaluator can compare the displayed target device 120 information to the actual target device 120 that the customer has brought into the store to confirm that the information corresponds to the actual device. If the information is correct, the local evaluator can confirm, for example via the touchscreen 212 interface of the evaluator input device 110.

In block 506, the routine displays a range of values for the target device 120, for example via the display 115 of the evaluator input device 110. For example, based on the specified target device 120, a range of possible resale values can be provided such as "$150-$325" depending on the condition of the target device 120. This range can represent an estimated value range for an as-yet unverified target device, which allows the customer 304 to determine whether to proceed with the full evaluation of the target device 120. Along with the range of values for the target device 120, the routine can present additional information to the customer 304 such as upgrade plans, options, and promotions that the retail store, carrier, or other entity has in place.

In decision block 510, the routine determines if the customer 304 elects to proceed with the device evaluation. If the customer 304 declines, then the routine ends. The customer's decision can be input via, for example, the touchscreen 212 associated with the evaluator input device 110, either by the local evaluator 302 or by the customer 304 herself. If the customer 304 elects to proceed, then the routine continues to block 512.

In block 512, the routine 500 directs the local evaluator 302 to obtain images and/or video of the target device 120. In some embodiments, the local evaluator 302 is directed to take specific pictures of the device using the camera 216 associated with the evaluator input device 110. For example the local evaluator 302 can be directed to take pictures of the front, back, and sides of the target device 120. In some embodiments, the local evaluator 302 can be directed to take images and/or video of the target device 120 with the screen both on and off.

In block 514, the routine 500 receives the images and/or video of the target device 120 and transmits them for inspection. For example, the images and/or video may be transmitted via communication link 270 (FIG. 2) to the remote server 308 (FIG. 3) for evaluation by one or more remote evaluators 310. The remote evaluator 310 can, in some embodiments, be a human staff member who is trained to review these images and/or video and grade the mechanical, LCD and other aspects of the target device 120. For example, in one embodiment the remote evaluator 310 can be an individual viewing images and/or video of the target device 120 on a display screen. The individual can rank the condition of the target device 120 based on her review of the images and/or video, for example ranking the target device 120 on a scale of 1 to 5, where 1 is poor condition and 5 is excellent condition. In some embodiments, the remote evaluation can be performed partly or wholly using machine vision techniques or other forms of automated visual inspection, without the need for trained human staff to view the images and/or video. For example, automatic machine vision can use algorithms to detect the presence of cracks on the screen, identify dead pixels, etc. In one example, a Canny edge detector can be applied to an image of the screen to identify cracks. In another example, the image of the target device can be compared with a sample image of the same make and model of electronic device that has no defects. The image of the target device can be subtracted from the sample image and the resulting image analyzed for the presence of cracks, dead pixels, or other defects.

In block 516, the routine directs the local evaluator 302 to connect the target device 120 to the evaluator hub device 130. The target device 120 can be connected to the evaluator hub device 130 via the wired connection 140, which as noted above can include a USB connector or other type of electrical connector for connection to the target device 120.

Once the target device 120 is connected to the evaluator hub device 130, the routine 500 electronically inspects the target device 120 in block 518. For example, the evaluator hub device 130 can query the target device 120 for information such as a device identifier (e.g., an IMEI number, serial number, etc.). In various embodiments, the format of the request and the type of information that can be received in response depends on the evaluator hub device 130 platform and on the type of connection between the evaluator hub device 130 and the target device 120. For example, when a target USB device is connected to a USB host, evaluation device, the host (e.g., the host USB controller) typically queries the target device with a GET_DESCRIPTOR query, which is specific to USB connections. Devices connected by other connection types (e.g., FireWire, Bluetooth, Thunderbolt, HDMI, Wi-Fi, etc.) can query target devices according to their the target device's protocols. In some embodiments, the routine 500 requests information from the target device 120 indirectly. For example, in some instances the target device 120 is a device that is configured to always act as a USB host device (e.g., the "A-device" connected to the "A" end of a USB cable). In these instances, when the evaluator hub device 130 is connected to the target device 120 via a USB connection, the target device 120 controls the USB. In such instances, the evaluator hub device 130 can, for example, act as a mass storage device (e.g., a USB memory stick) that contains an auto-run file configured to be automatically executed by the host computer. When the target device 120 detects the connected evaluator hub device 130 as a mass storage device, the target device 120 accordingly executes instructions from the auto-run file. The evaluator hub device 130 can thus cause the target device 120 to copy information from the target device 120 to the evaluator hub device 130.

In some embodiments, the routine 500 can directly obtain detailed information about the target device 120 and its configuration after the customer 304 gives the app permission to obtain some or all of the information that would be useful to determine the value of the target device 120. For example, when an evaluator hub device 130 is connected to an iOS® target device 120 via a USB or Wi-Fi connection, the target device 120 may display a dialog on a touchscreen of the target device 120 asking the user whether to "Trust This Computer?", i.e., the evaluator hub device 130, and display virtual buttons labeled "Trust" and "Don't Trust". The customer 304 can select the "Trust" option allowing the evaluator hub device 130 to access settings and data on the target device 120 such as a the target device's IMEI number, make, model, memory capacity, etc. As another example, in some instances, the app can be installed and/or run on more than one device, enabling the apps to cooperatively evaluate the target device 120. For example, if the target device 120 and the evaluator hub device 130 are both running instances of the app, and the app running on the target device 120 can communicate with the app running on the evaluator hub device 130, then the app running on the target device 120 can directly access information about the target device 120 (e.g., using APIs or data stores) and communicate that information to the app running on the evaluator hub device 130.

In some embodiments, the evaluator hub device 130 can electronically request information from the target device using, for example, a USB GET_DESCRIPTOR query. In response to this query, the target USB device can transmit codes representing the device class and subclass (indicating the functional type of the device, such as a printer device, smart card device, still imaging device, video device, etc.), the IMEI number (indicating the make of the device, such as Apple, Inc.), and the product ID and release number (indicating the model of the device, such as a Thunderbolt Display). In some embodiments, the routine 500 receives such information about target USB devices in response to a system level API query or by reading a system data file.

In some embodiments, the app can query a USB.org vendor ID list with the target device vendor ID code to obtain the name of the target USB device vendor. As another example, the app or the remote server can obtain a target mobile phone IMEI number and then communicate remotely (via, e.g., a wireless or wired link) with a backend database such as the GSMA IMEI Database, parsing the IMEI to determine or verify the phone make and/or model. The routine 500 can use such queries to obtain meta-information to e.g., confirm whether various sources of information about the target device 120 are consistent with each other. Evaluating the target device 120 can also include determining what kind of information is and is not available about the target device 120. For example, depending on the type of electronic device, it may or may not be possible to perform tests to gauge the condition of the target device 120 (e.g., to assess the processor, the battery, and/or the screen, and so on). In some embodiments, evaluating the target device 120 includes determining whether the target device 120 is associated with a remote user account that enables remote user control of the target device 120 (such as tracking the target device 120 and/or erasing data from the target device 120), and/or identifying other potential issues that could affect the operation of the target device 120, its resale value, and/or its ability to be resold.

In some embodiments, the customer allows the evaluator hub device 130 to have access to the data on the target device 120, and the routine 500 can receive detailed information about the target device 120. For example, on a mobile phone target device 120, the app can access logs to obtain information such as the number of charge-discharge cycles (to indicate the condition of the rechargeable battery in the phone) and/or call logs (to indicate possible issues with radio hardware or software if calls recently were not successfully completed), etc. The app can obtain information necessary to identify and/or evaluate the target device, such as a unique identifier (e.g., an IMEI number or an MEID or equivalent number of a mobile phone, a hardware media access control address (MAC address) of a networkable device, or a model number and serial number of the electronic device); information describing the device manufacturer (e.g., a manufacturer name or ID code), model, characteristics and capabilities (e.g., CPU type and speed, storage capacity (SRAM, DRAM, disk, etc.), wireless carrier, radio bands (frequency ranges and encodings such as CDMA, GSM, LTE, etc.), and/or color); and the like. Characteristic information about the target device 120 includes the device make, model, and configuration. In some embodiments, the app can obtain information about the target device 120 and/or the user (e.g., location information) stored in the memory of the target device 120 and/or access features of the target device 120 such as the camera and/or radios.

In block 519, the routine 500 evaluates the information obtained from the electrical inspection of the target device in block 518. Evaluating the information about the target device 120 can include, for example, assessing the physical and/or electrical condition of the target device 120 based on the information obtained in blocks 516 and 518, so that the app can price the target device 120 based at least in part on its condition. In some embodiments, the app can perform tests to reveal the condition of the target device 120, such as tests of processor performance, battery charging rates and/or capacity, memory tests for quality of the memory, test calls to confirm sufficient operation of device radios, and so forth). In some embodiments, the local evaluator 302 can provide input regarding evaluation of the target device 120. For example, the app can perform interactive tests that incorporate user (e.g., local evaluator 302) feedback, such as screen tests (e.g., asking whether there are any cracks in the glass and/or displaying a solid color or pattern on an LCD or LED display and prompting the user to identify dead or stuck pixels in the display), and/or interactive tests that include user action such as directing the user to activate a function on the target device 120 (e.g., turning on a Bluetooth radio so that the app on the evaluator input device 110 can detect and/or test the radio function). In some embodiments, the target device 120 has a display screen, and the routine 500 can cause the target device 120 to display a test pattern or information on its display screen for the user to inspect and/or interact with. If the user is able to view the pattern or information and, e.g., respond to prompts regarding the pattern or information, the routine 500 can establish that the target device screen, touchscreen, keyboard, and/or other components of the target device 120 are working. In some embodiments, input from the local evaluator 302 can be solicited and received when the local evaluator 302 is obtaining images and/or video of the target device 120 (e.g., in blocks 512 and 514).

In block 520, the routine 500 determines an offer price for the target device 120 based on the visual and electrical inspection of the target device 120. In various embodiments, the app on the evaluator input device 110, the evaluator hub device 130, and/or a remote server 308 can query a local or remote database (e.g., the database 306) using the evaluation in block 519. Based on the electrical and visual inspections, the routine 500 determines an appropriate offer price for the target device 120, in block 520. In some embodiments, the price can be obtained from a database or pricing model which can be, for example, a local lookup table of common devices on the evaluator input device 110, the evaluator hub device 130, and/or a remotely hosted database or web service to which the app can transmit information about the target device 120 and receive a current market value or offer price for the target device 120. In one embodiment, a database can include a range of prices for a particular make and model of target device depending on the condition. For example, the target device can be graded on a scale of 1 to 5 depending on the electrical and/or visual inspection of the device, with 1 being "poor" and 5 being "excellent." The database can then include a price for the identified target device corresponding to each condition (e.g., condition "1"=$0; condition "2"=$100; condition "3"=$150; condition "4"=$200; and condition "5"=$250). In some embodiments, determining an offer price includes estimating a future value of the target device 120, or future values projected over time. Such projections can be based on, for example, past depreciation and/or anticipated release schedules for future devices (such as new Apple® iPhone® mobile phones).

In block 522, the routine 500 presents the customer with an offer price for the target device 120 (e.g., by displaying a message on the evaluator input device 110 via the screen 115 which local evaluator can communicate to the customer, by sending the user a text or email message, etc.). In some embodiments, the routine 500 can additionally present related offers of promotions available for recycling the target device 120.

In decision block 524, the routine 500 determines whether the customer 304 elects to recycle the target device 120 at the offer price. For example, the app can present options that the customer 304 can select to indicate the user's interest in selling the target device 120 or obtaining additional information about the recycling process, such as touchscreen 212 buttons on the display 115 of the evaluator input device 110. If the customer 304 chooses not to recycle the target device 120 or get additional information about recycling the target device 120, the routine 500 ends. Conversely, if the customer 304 elects to recycle the target device 120, then in block 526, the routine 500 provides instructions to the customer 304 for recycling the target device 120, for example the customer 304 can be instructed to power down the target device 120 and submit it to the local evaluator 302 in exchange for compensation. As another example, the routine 500 can electronically send the customer an electronic voucher or redemption code for the target device 120, which can be used in the carrier store to dispense value or award store credit to the customer in exchange for the target device 120. When recycling the target device 120, the local evaluator 302 can accept the device after confirming the identification of the customer 304 (e.g., by checking the customer's driver license, reviewing customer data in the retail store's system (e.g., via database 306), etc.). In exchange for the target device 102, the local evaluator 302 or another individual associated with the retail store can dispense value (e.g., cash, credit, etc.) to the customer 304. After block 524, the routine 500 ends.

In some embodiments, some of the information that is gathered electronically can also be gathered from the retailer or carrier database (e.g., database 306) and/or entered manually by the local evaluator 302. For instance, if the customer 304 is a returning customer, the carrier would likely have specific information on file about the target device 120. The local evaluator 302 would, in this case, know or be able to quickly obtain the IMEI number and other such information that uniquely identifies the target device 120, memory configuration, specific model version/build and other information that could affect the overall value of the device. This and other such information can be linked through interfaces and pulled to the evaluator input device 110 when the local evaluator selects a software button or other interface feature to confirm the target device 120 is the same device as is on file for that particular customer.

Figure 6:
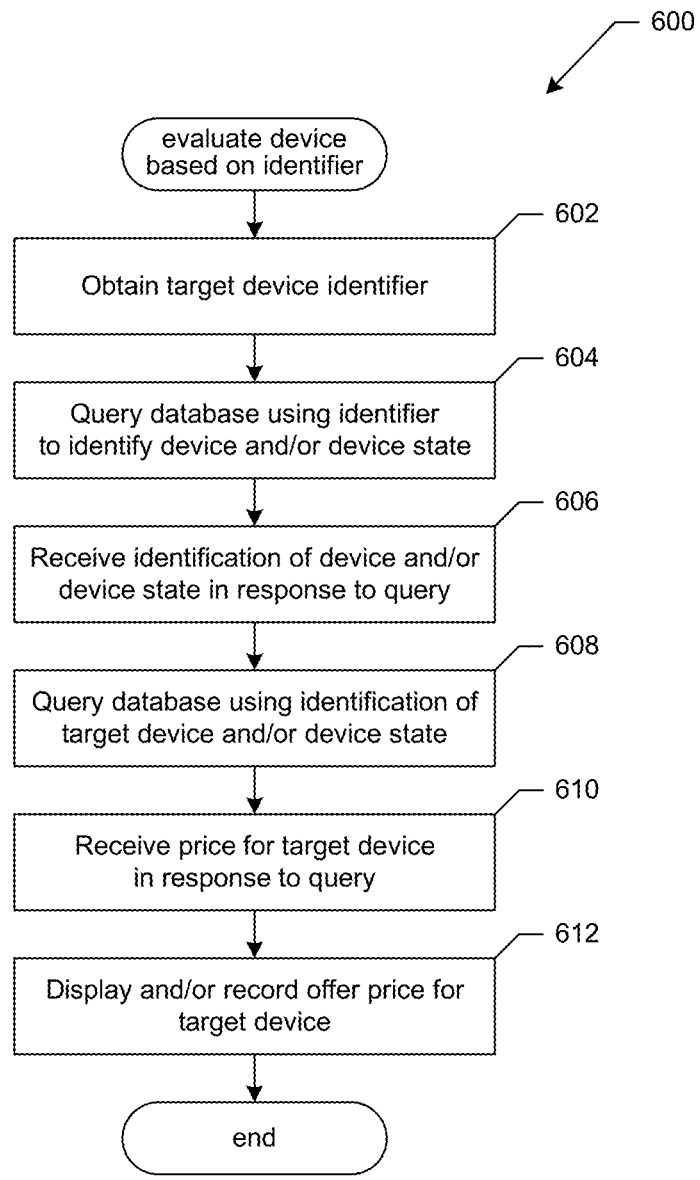
FIG. 6 is a flow diagram of a routine for identifying and pricing a target device for recycling in accordance with embodiments of the present technology.

FIG. 6 is a flow diagram of a routine 600 for evaluating a target device 120 for recycling in accordance with embodiments of the present technology. In various embodiments, an app running on an evaluator device (e.g., the evaluator input device 110 of FIG. 1) and/or another processing device operatively connectable to the app, such as the evaluator hub device 130 or a remote server 308, can perform some or all of the routine 600. In some embodiments, the routine 600 can be performed when the user (e.g., the local evaluator 302) directs the app to price the target device 120 for possible recycling, causing the app to obtain information about the target device 120 (e.g., an identifier of the target device 120). The routine 600 enables the app and/or a remote processing device to identify the target device 120 and determine an offer price for the target device 120 based on the identification of the target device 120.

In block 602, the routine 600 obtains an identifier of the target device 120. Examples of target device 120 identifiers include the IMEI of a mobile phone, the model and/or serial numbers of a laptop computer, a unique wireless identifier of the target device 120 such as a Wi-Fi interface media access control address (MAC address), a product bar code, USB vendor ID and device ID (and release number) codes, etc. The app running on the evaluator input device 110 can obtain the identifier from the target device 120 using one or more of the routines described above with reference to, e.g., FIGS. 4 and 5 (electrically interrogating the target device).

In block 604, the routine 600 queries one or more databases (e.g., the database 306 of FIG. 3) using the identifier to identify the target device 120 and/or the state of the target device 120. For example, the app can construct a database query string based on information such as the model number, serial number, and/or IMEI of the target device 120 obtained by the electrical interrogation and/or visual analysis of the target device 120. The app can use one or more local and/or remote databases, such as a locally stored lookup table included in or associated with the app on the evaluator input device 110 and/or a remotely hosted database or service for responding to queries. The local and/or remote database can be a data structure indexed against device identifiers and/or configured to identify popular devices and/or target devices 120 that the customer has previously used or indicated owning. In some embodiments, for example, the app contains a database of several popular electronic devices. The app can compare the information about the target device 120 to the information in the local database to determine whether the target device 120 is one of the several popular devices. If no match is found, the app can transmit a query to a remote server for comparison against a database of a larger number of devices or ask for manual input of device identity.

In block 606, the routine 600 receives information identifying the target device 120 and/or the state of the target device 120 in response to the querying described above. For example, the app can receive an identification of the device maker, model designation, known features and/or characteristics, options and/or additional target device-specific information to prompt the user for, etc. in response to a query that includes the target device model number. The information can be received in a format or data structure that the app is configured to recognize and/or parse. The app can also communicate with remote servers and/or services such as the GSMA IMEI Database (e.g., for parsing mobile phone IMEI numbers), a database of stolen devices (e.g., including device identifiers associated with police reports), and/or a service configured to provide data about whether an electronic device is associated with a remote user account (e.g., Apple® GSX servers or the icloud.com/activationlock/ "Check Activation Lock Status" web-based service for iCloud® accounts). Using the responses from such local and/or remote databases, the routine 600 can determine the identity of the target device 120 (e.g., its make and model) and determine whether the target device 120 is in an acceptable state for processing (e.g., determining whether the target device 120 is subject to remote user control such as remote tracking, locking, data erasure ("wiping"), and/or disabling (a "kill switch"), which would need to be disabled before recycling the target device).

In block 608, the routine 600 queries a database for device pricing using the identification of the target device 120 and/or the state of the target device 120. In various embodiments, the app or a remote server can query a local or remote database (e.g., the database 306) using the target device information. For example, after the app receives a standardized identification of the target device 120 (e.g., a particular model name and/or number), the routine 600 can search a local and/or remote data structure that maps the standardized identification information to pricing information for the target device 120. For example, as described above with reference to FIG. 5, the app on the evaluator input device 110 can download pricing data from a remote server (e.g., the server computer 308 of FIG. 3), such as a lookup table, pricing model, or other data structure containing prices for popular electronic devices, and look up the target device make and model in that downloaded data and/or in a remote database (e.g., the database 306). In some embodiments, the app on the evaluator input device 110 can submit a query that includes information about the state and/or condition of the target device 120, to obtain a more accurate price for the target device 120.

In block 610, the routine 600 receives an offer price for the target device 120 in response to the query. In some instances, the price includes a range of offer prices. In block 612, the routine 600 displays and/or records the offer price for the target device 120. For example, the routine 600 can present the offer price to the user (e.g., the local evaluator 302 and/or the customer 304) via the display screen 115 of the evaluator input device 110, and/or send the user an electronic message conveying the offer price for the target device 120. In addition or instead, the evaluator input device 110 app and/or the remote server can store the price in a lookup table indexed against a native or assigned identifier of the target device 120. The routine 600 can record the offer price for the target device 120 locally on the evaluator input device 110 and/or remotely (e.g., together with the information about the target device). For example, the app can store a record of the price for the target device 120 and timestamp of the price, and/or can transmit the price data to the remote server 308, or to the cloud storage facility 326, so that any remote server can retrieve the target device 120 price from a server to facilitate the purchase of the target device 120 based on the determined price. After storing the price for the target device 120, the routine 600 ends.

The present technology allows devices of various types, such as mobile phones (smartphones and feature phones, for example), tablet computers, wearable computers, game devices, media players, laptop and desktop computers, etc. (e.g., the target device 120) to be evaluated by a software application on an evaluator input device 110 to facilitate purchasing by a retailer. The present technology enables the user to use the evaluator input device 110 in conjunction with the evaluator hub device 130 to obtain information about the target device 120 and/or the user, obtain a price quote for the target device 120 so that the user can sell the target device 120 with greater certainty and speed.

The above Detailed Description of examples and embodiments of the invention is not intended to be exhaustive or to limit the invention to the precise form disclosed above. Although specific examples for the invention are described above for illustrative purposes, various equivalent modifications are possible within the scope of the invention, as those skilled in the relevant art will recognize.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

Although the above description describes various embodiments of the invention and the best mode contemplated, regardless how detailed the above text, the invention can be practiced in many ways. Details of the system may vary considerably in its specific implementation, while still being encompassed by the present technology. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method in a computing system for remotely evaluating a consumer electronic device for recycling, the method comprising:
    at a remote device evaluation station in a first location—
        receiving, from a handheld evaluator input device in a second location, and via a processor of the remote device evaluation station, a request from a first human operator for assistance evaluating the consumer electronic device;
        receiving, from the handheld evaluator input device, and via the processor of the remote device evaluation station, an image of the consumer electronic device;
        displaying, via a display screen of the remote device evaluation station, the image and the request to a second human operator;
        receiving inspection data associated with the consumer electronic device from an evaluator hub device, wherein the evaluator hub device is configured to electrically inspect the consumer electronic device, and wherein the inspection data includes data associated with an electrical inspection of the consumer electronic device performed by the evaluator hub device; and
        transmitting to the handheld evaluator input device, via the processor of the remote device evaluation station, a compensation value for the consumer electronic device based at least in part on the inspection data and an evaluation of the image by the second human operator.

2. The method of claim 1 wherein the evaluation is performed at least partially by the second human operator.

3. The method of claim 1 wherein the remote device evaluation station includes a remote evaluator server in communication with the handheld evaluator input device.

4. The method of claim 1 wherein the evaluation of the image includes a grade associated with a cosmetic condition of the consumer electronic device.

5. The method of claim 1, further comprising, at the remote device evaluation station, receiving an input from the second human operator associated with a cosmetic condition grade of the consumer electronic device.

6. The method of claim 1 wherein the handheld evaluator input device includes a camera, and wherein receiving the image from the handheld evaluator input device includes receiving, at the remote device evaluation station, the image captured by the camera of the handheld evaluator input device.

7. The method of claim 1 wherein determining the compensation value for the consumer electronic device comprises determining a range of compensation values, and wherein transmitting the compensation values to the handheld evaluator input device includes transmitting the range of compensation values for the consumer electronic device to the handheld evaluator input device.

8. The method of claim 1, further comprising, at the remote device evaluation station, causing the handheld evaluator input device to display the determined compensation value to the first human operator via a display screen of the handheld evaluator input device.

9. The method of claim 1 wherein determining the compensation value for the consumer electronic device includes—
    transmitting information associated with the consumer electronic device from the remote device evaluation station to a server computer; and
    transmitting pricing data remotely from the server computer to the handheld evaluator input device.

10. The method of claim 1 wherein determining the compensation value includes, at the remote device evaluation station, receiving an input associated with the compensation values from the second human operator.

11. The method of claim 1 wherein determining the compensation value includes, at the remote device evaluation station, receiving an input including the compensation values from the second human operator.

12. The method of claim 1 wherein determining the compensation value includes, at the remote device evaluation station, automatically determining the compensation values based at least partially on the image of the consumer electronic device.

13. The method of claim 1, further comprising, at the remote device evaluation station, sending a prompt to the first human operator via the handheld evaluator input device to connect the consumer electronic device to the evaluator hub device.

14. The method of claim 1 wherein the handheld evaluator input device is a mobile computer, wherein the evaluator hub device is a stationary computing device, and wherein the consumer electronic device is a mobile telecommunications device.

15. The method of claim 1, further comprising, at the remote device evaluation station, displaying, via the display screen, the inspection data to the second human operator.

16. The method of claim 1 wherein receiving the inspection data for the consumer electronic device from the evaluator hub device includes, at the remote device evaluation station, causing the evaluator hub device to electronically send a request for information associated with the consumer electronic device to the consumer electronic device.

17. The method of claim 16 wherein electronically sending the request from the evaluator hub device to the consumer electronic device includes communicating via USB, Wi-Fi, or Bluetooth.

18. The method of claim 16 wherein electronically sending the request from the evaluator hub device to the consumer electronic device includes querying an operating system API of the consumer electronic device for information from the consumer electronic device.

19. The method of claim 16 wherein electronically sending the request from the evaluator hub device to the consumer electronic device includes causing the evaluator hub device to be configured as a USB mass storage device containing an auto-run file, wherein the auto-run file includes instructions prompting the consumer electronic device to provide identification information associated with the consumer electronic device to the evaluator hub device.

20. The method of claim 16 wherein electronically sending the request from the evaluator hub device to the consumer electronic device includes causing the evaluator hub device to send the request via USB, and wherein receiving the inspection data includes receiving device class, vendor ID, and product ID information.

\* \* \* \* \*